United States Patent
Hershbarger

(10) Patent No.: US 8,111,761 B2
(45) Date of Patent: Feb. 7, 2012

(54) METHOD AND APPARATUS FOR TRANSMITTING DATA AND POWER ACROSS A TRANSFORMER

(75) Inventor: Russell Hershbarger, Nevada City, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 12/726,648

(22) Filed: Mar. 18, 2010

(65) Prior Publication Data

US 2010/0322323 A1  Dec. 23, 2010

Related U.S. Application Data

(63) Continuation of application No. 11/477,130, filed on Jun. 27, 2006, now Pat. No. 7,733,965, and a continuation-in-part of application No. 10/857,469, filed on May 28, 2004, now Pat. No. 7,158,573.

(60) Provisional application No. 60/695,250, filed on Jun. 28, 2005, provisional application No. 60/474,009, filed on May 29, 2003.

(51) Int. Cl.
*H04B 3/00* (2006.01)
*H04B 1/38* (2006.01)
*H04L 27/00* (2006.01)

(52) U.S. Cl. ......................... 375/258; 375/219; 375/295

(58) Field of Classification Search .................. 375/258, 375/219, 222, 295, 316, 257; 337/105, 106; 333/100, 119; 370/276; 379/93.01
See application file for complete search history.

(56) References Cited

U.S. PATENT DOCUMENTS

| 3,562,720 | A |   | 2/1971  | Bernier |
|-----------|---|---|---------|---------|
| 5,384,808 | A |   | 1/1995  | Van Brunt et al. |
| 5,506,900 | A |   | 4/1996  | Fritz |
| 5,654,984 | A |   | 8/1997  | Hershbarger et al. |
| 5,994,998 | A | * | 11/1999 | Fisher et al. ............ 375/258 |
| 6,496,105 | B2 | * | 12/2002 | Fisher et al. ............ 375/258 |
| 7,167,081 | B2 |   | 1/2007  | Strumpf et al. |
| 2003/0128053 | A1 |   | 7/2003 | Haigh et al. |
| 2004/0239487 | A1 |   | 12/2004 | Hershbarger |

FOREIGN PATENT DOCUMENTS

| GB | 2249919 |   | 5/1992 |
| WO | 81/00658 |   | 3/1981 |
| WO | WO 2007/002825 | * | 1/2007 |

* cited by examiner

*Primary Examiner* — Tesfaldet Bocure

(57) ABSTRACT

Encoding of a dual mode digital signal for transfer using a dual mode super source follower circuit to drive the signal across a pulse transformer is presented. The dual mode signal includes data in one mode and power/control in the other mode. In the power/control mode the magnitude of the signal pulses are greater than the magnitude of the data pulses. Thus, the current sinking deficiencies of the super source follower may introduce waveform irregularities when transitioning from the high of the power pulse to the high of the data pulse. An encoding method described herein uses a return to zero scheme to avoid such waveform irregularities during power to data transitions.

18 Claims, 17 Drawing Sheets

METHOD AND APPARATUS FOR TRANSMITTING DATA AND POWER ACROSS A TRANSFORMER

CROSS REFERENCE TO RELATED APPLICATIONS

This application is a continuation of U.S. patent application Ser. No. 11/477,130 filed Jun. 27, 2006 entitled "Encoding Method And Apparatus For A Dual Mode Super Source Follower Circuit," now issued as U.S. Pat. No. 7,733,965 on Jun. 8, 2010 which claims the benefit of priority from U.S. Provisional Application No. 60/695,250 filed on Jun. 28, 2005, entitled "Encoding Method And Apparatus For A Dual Mode Super Source Follower Circuit" and which is a continuation-in-part of U.S. patent application Ser. No. 10/857,469, filed on May 28, 2004, entitled "A Method and Apparatus for Full Duplex Signaling Across a Transformer Circuit," now issued as U.S. Pat. No. 7,158,573 on Jan. 2, 2007 which claims the benefit of priority from U.S. Provisional Application No. 60/474,009 filed on May 29, 2003, the specifications of all of which are incorporated by reference herein in their entirety.

BACKGROUND OF INVENTION

1. Field of the Invention

This invention relates to the field of electronic communications. More specifically the invention relates to communication across an isolation barrier transformer using a transmit driver composed of dual mode super source follower circuit.

2. Background

An isolation barrier is generally used in applications in which it is desired to keep voltage potentials in one portion of a circuit isolated from voltages in another portion, e.g., to prevent relatively excessive and/or harmful voltages from entering a relatively low voltage or voltage sensitive circuit. Such applications may include, for example, telephony, medical, industrial, and other similar applications.

For example, in a telephony application, it may be necessary to protect communication circuitry from high voltages on the telephone line by placing an isolation barrier between the communication circuitry and the telephone line. However, while it is desirable to prevent harmful voltages from crossing from one side of an isolation barrier to the other, it is also desirable to facilitate signal communication between circuits on both sides of the barrier. In telephony applications, the isolation requirement is generally imposed by some governmental requirement (e.g., FCC part 68 in the US).

The transformer is one of several types of electrical devices that may be used as an element of an isolation barrier. However, in the prior art, digital communication across a transformer generally requires either a pulse transformer for each direction of communication, or time domain multiplexing of a pulse transformer (i.e., half-duplex communication). Prior art systems are incapable of full-duplex digital communication across a single transformer.

Half-duplex communication reduces communication bandwidth as each direction of communication must wait its turn to use the one-way signal channel. However, the use of multiple transformers to achieve two-way communication is expensive in terms of cost and space. A full duplex, single-transformer solution is therefore desired.

Unfortunately, the electrical characteristics of a transformer make it difficult to simultaneously drive a transmit signal onto, and detect a receive signal from, the same port of a transformer. For example, a transmit voltage signal driven across one port of a transformer gives rise to a load current component and a magnetizing inductance current component. The load current is proportional to the transmit voltage signal divided by the load impedance across the second port of the transformer. The magnetizing current on the other hand is generated by the inductance of the transformer coil being driven, and is proportional to the integral of the transmit voltage signal that appears across the first port of the transformer. The value of the magnetizing current is thus dependent upon the history of the transmit signal.

Also, the circuits on the line side of the isolation barrier may need power to operate at times when no other source of power is available on the line side. In those instances, there may be a need to transfer power from the host side to the line side. Thus, it would be desirable and advantageous to have a system that facilitates full-duplex signaling and power transfer across the same transformer isolation barrier.

SUMMARY OF INVENTION

The present invention provides an encoding method and apparatus for a dual mode super source follower circuit. In particular, this invention relates to the realization of a transmit driver and an accompanying encoding method for the transmit data that enable simultaneous bi-directional communication over a transformer while providing a means to transfer power across the transformer at the same time.

Full duplex communication across a transformer may be accomplished by driving a first communication signal (referred to herein as "transmit data") across the transformer from a first side (e.g., the primary) to achieve communication in a first direction, and modulating the load impedance on the second side (e.g., the secondary) in accordance with a second communication signal (referred to herein as "receive data") to achieve communication in the reverse direction.

In one or more embodiment, power pulses are sent across the barrier transformer in bursts from the host side to the line side to provide power, as necessary, for the line side devices. The power pulses may be time-division multiplexed with the transmit data in interwoven frames before final encoding.

In one or more embodiments, the transmit data from the primary to the secondary of the transformer may be doubly DC-balanced. With such encoding, the current sourced by the transmit driver will consist primarily of load current and zero magnetizing current at a prescribed time (e.g. at the end of each Manchester period).

The final transmit bit stream, which comprises power, data and control is driven across the transformer isolation barrier by a dual-mode super source follower voltage driver circuit. The voltage driver circuit includes a tri-statable super source follower circuit for driving the transmit data and a tri-statable digital voltage driver for driving the power pulses. The tri-statable nature of the circuits allows one driver to be placed in a high impedance state while the other driver drives the transformer terminals. Thus, the data and power transmission may occur at significantly different power levels, e.g., 3 volts for power and 0.5 volts for data.

At the boundary between power and data frames, a return to zero encoding scheme is enforced to circumvent a transition where a transformer primary is being driven from high voltage (e.g., 3 v) by the digital voltage driver to a high voltage (e.g., 0.5 v) by the super source follower. Such a transition might stress the super source follower and cause the drive actually delivered to the transformer at the boundary to deviate from ideal. The return-to-zero scheme involves encoding the power pulses based on the knowledge of the characteristics of the data pulses. For instance, prior to a final Manchester encoding step, the first and last bits of the power frame are matched with the adjacent data bits in the preceding and succeeding data frames. To maintain DC balancing, the second power bit and the next to last power bit are set to the inverse of their respective adjacent end power bit. This encoding of the power bits insures that the subsequent Manchester encoding results in a transition to zero or from zero at the power and data frame boundaries.

DETAILED DESCRIPTION

An encoding method and apparatus for a dual mode super source follower are described. In the following description, numerous specific details are set forth to provide a more thorough description of embodiments of the invention. It will be apparent, however, to one skilled in the art that the invention may be practiced without these specific details. In other instances, well known features have not been described in detail so as not to obscure the invention.

Embodiments of the present invention may be used in communication circuits to support simultaneous, bi-directional communication of data, for example, and transfer of power across an isolation barrier of a DAA circuit. Thus, for purposes of illustration, the method and apparatus of the present invention will be described below within the context of a DAA isolation barrier implementation. Although the discussions herein are concentrated on the disclosed DAA environment, it should be apparent to those of skill in the art that the principles expounded herein are applicable to other applications involving a voltage driver.

Implementation Example

DAA Embodiment

Signal communication across an isolation barrier is generally useful for telephony, medical, industrial, and other applications wherein it is desired to separate voltage potentials. In telephony applications, communication devices (e.g., computers, fax machines, etc.) typically connect to the PSTN (public switched telephone network) through modem devices to send and receive signals over the telephone lines.

A DAA circuit (data access arrangement) provides the interface between the modem device and the telephone lines, including the isolation barrier. The DAA may be described in terms of a "line side" (i.e., that portion of the circuitry that couples to the telephone line), a "host side" (i.e., that portion of the circuitry more closely associated with the host device; also referred to as the "modem side" or "DSP side"), and an isolation barrier that separates the line side and the host side. The isolation barrier may include one or more isolation elements, as well as one or more isolation element types (e.g., transformers, capacitors, optical couplers, etc.).

Figure 1:
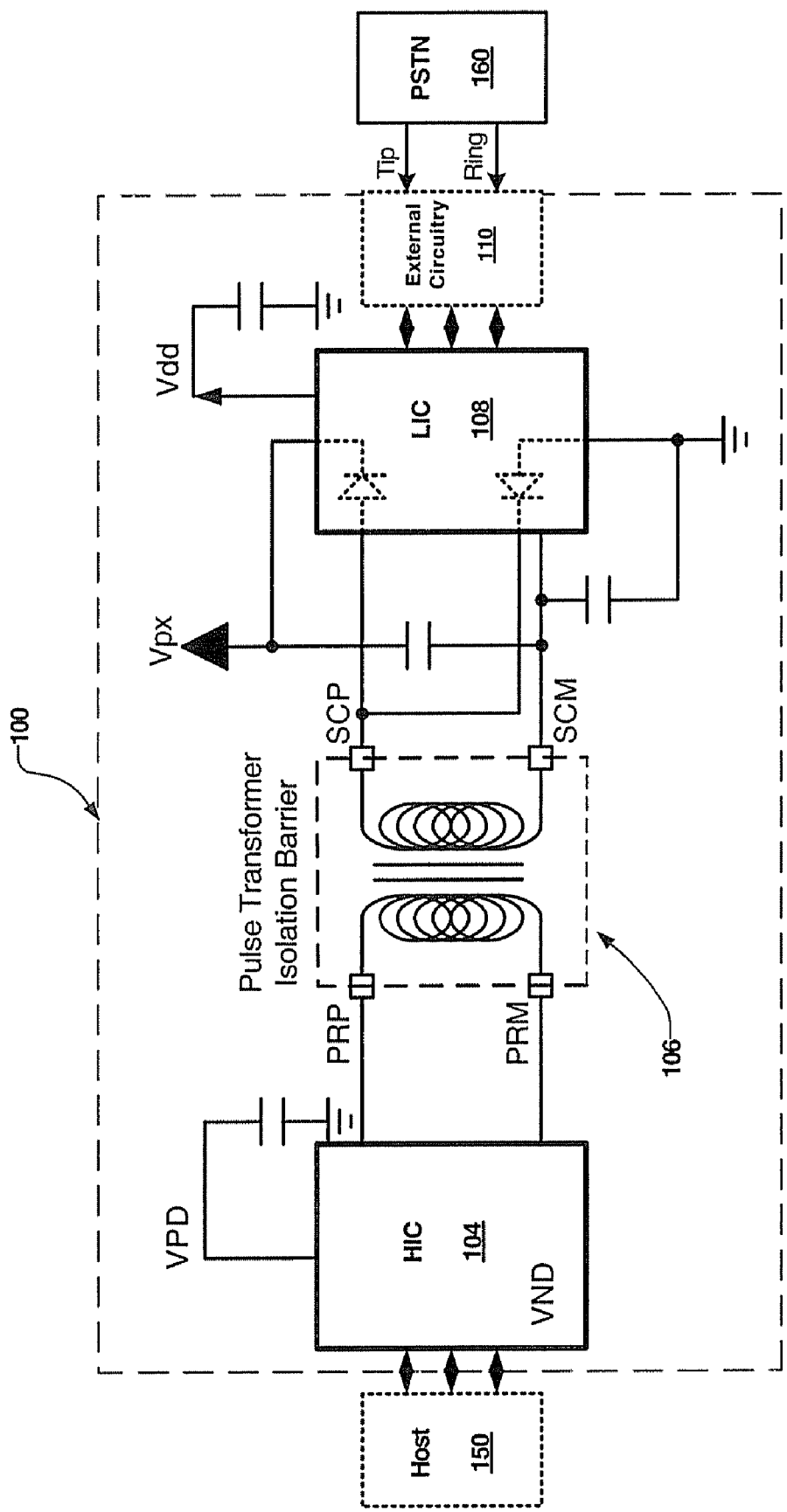
FIG. 1 is block diagram of a modem Codec DAA (data access arrangement) connecting a host/DSP to a public switched telephone network in accordance with an embodiment of the present invention.

FIG. 1 is a block diagram of one embodiment of a modem DAA connecting a host/DSP to a PSTN. In this illustration, DAA 100 connects Host Computer 150 to PSTN 160 via the "tip" and "ring" lines of the telephone network. DAA 100 comprises Host Interface Component (HIC) 104; Isolation Barrier 106; Line Interface Component (LIC) 108; and external circuitry 110. HIC 104 interfaces the DAA functions with Host 150. Host 150 may include, for example, a DSP, personal computer, or similar device.

External circuitry 110 provides circuitry for connection of the DAA to PSTN 160. Typically, the PSTN signal is analog in nature. The analog information from the PSTN may be converted to digital information in LIC 108 before transmission across Isolation Barrier 106 to HIC 104. In one embodiment, Isolation Barrier 106 comprises a pulse transformer.

In telephony applications, analog voice band signals (e.g., 300 Hz-3.6 KHz) on the phone line may be converted to digital data in LIC 108 using modulation/demodulation techniques (e.g., at the rate of 1.536 Mbps for an 8 kHz sampling rate). The generated digital data may be further processed and/or directly time-division multiplexed with status and other information to form an effective transfer rate that may be higher than the bit rate of the digital data being sent across the transformer of Isolation Barrier 106. HIC 104 may subsequently demultiplex the received bit stream into the various components, e.g., voice band signal, status, and other information. HIC 104 may digitally filter the voice band signal, decimate and demodulate the voice band signal to extract the original voice band information, and then send the extracted digital voice band data (e.g., in 16-bit samples) to Host 150.

In the other direction (i.e., transmission from Host 150 to PSTN 160), HIC 104 may receive digital information from Host 150 for transmission to PSTN 160. HIC 104 may receive the digital information in the form of a digital data stream or other form (e.g., 16-bit data at 16 kHz) from Host 150 and may serialize it via a parallel-to-serial converter (or an appropriate modulation technique) to a bit stream of appropriate rate (such as, but not limited to, 256 kbps or 1.536 Mbps). In accordance with one or more embodiments of the invention, an encoding scheme may be used to maintain DC-balanced current and voltage characteristics within the signal driven across the transformer of Barrier 106, thus raising the actual data transfer rate across the barrier to the full transfer speed (such as, but not limited to, 512 kbps or 2.048 Mbps). The digital bit stream is then received by LIC 108.

Communication across Isolation Barrier 106 may be performed in full-duplex. In addition to the data communicated across the barrier, control and clocking information, as well as power may be sent across the barrier. For instance, clocking information used to reconstruct the HIC clock in LIC 108 may be embedded in the bit stream sent across the barrier from HIC 104.

In one embodiment of the DAA circuit, HIC 104 may provide power needed by LIC 108 while the phone line connection is "on-hook." However, after the phone line connection goes "off-hook," LIC 108 may be entirely line powered, if power is available from the telephone line.

A serial data port may be provided for transferring "receive" data and status information from HIC 104 to Host 150 and "transmit" data and control information from Host 150 to HIC 104. As used herein, "receive" data is data sent from the line side to the host side and "transmit" data is data sent from the host side to the line side.

In the descriptions that follow, the primary side of transformer 106 is connected to HIC 104 and the secondary side of transformer 106 is connected to the LIC 108 for consistency in description. It should be apparent to those of skill in the art that other arrangements are also possible. In addition, "forward direction" refers to data and control bits driven onto the primary by the HIC drivers. Clocking and power may also be provided in the forward direction. The "reverse direction" is data received by HIC 104 from across Barrier 106.

Pulse transformer 106 may have, for example, a 1:1 (PRI: SEC) winding ratio. However, it should be apparent to those of skill in the art that the transformer ratio is in no way constrained to those discussed herein.

The pulse transformer has advantages over other types of isolation elements. For instance, advantages of a pulse transformer over a capacitor as the isolation element include lower cost Bill of Materials (BOM); lower component count; and better common mode noise immunity. In addition, it may be easier to send power across a transformer with minimum loss (e.g., HIC 104 sending power across to LIC 108) while the phone line connection is "on-hook."

Figure 2:
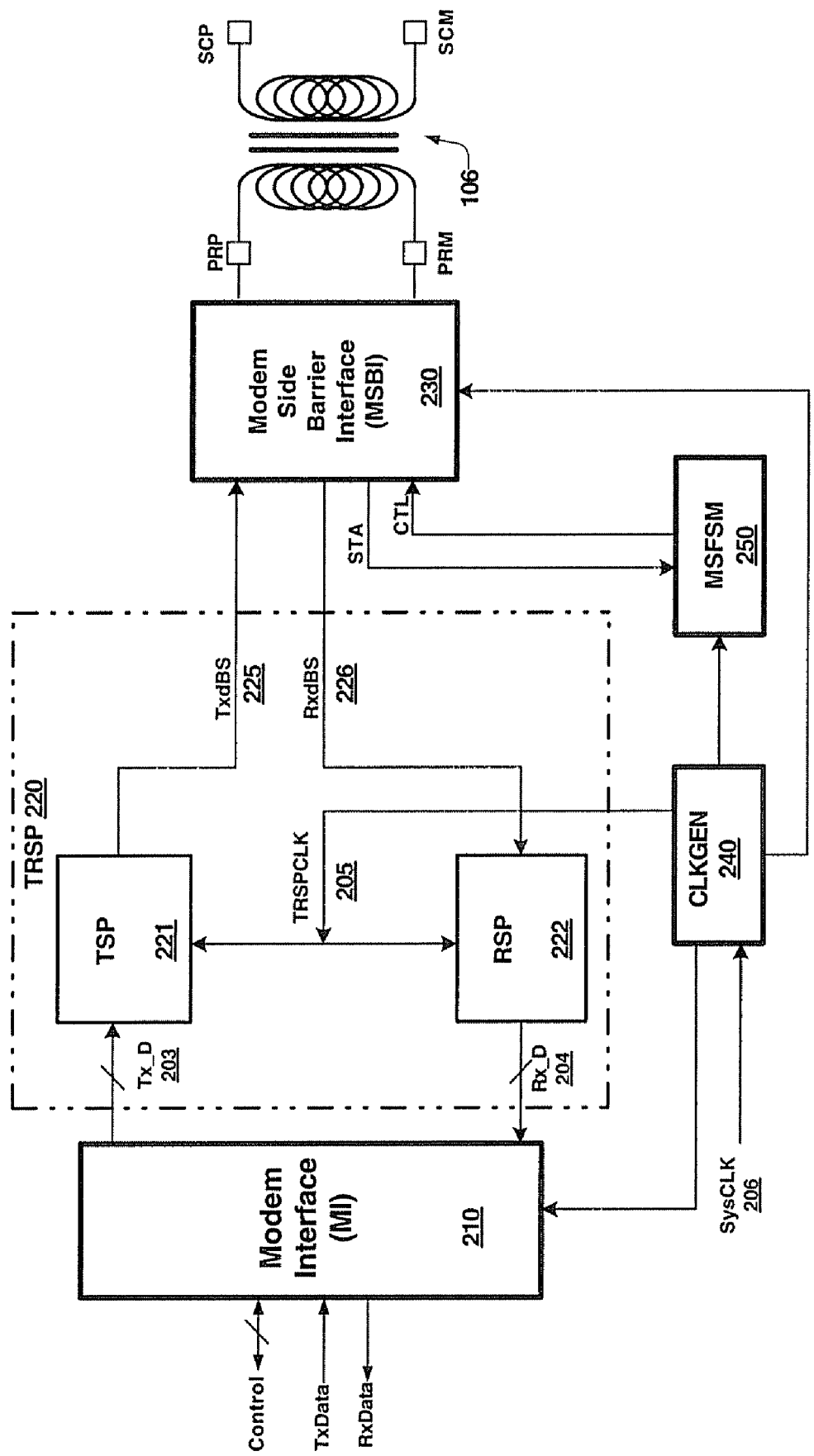
FIG. 2 is a block diagram of a Host Interface Component in accordance with an embodiment of the present invention.

FIG. 2 is a block diagram of an embodiment of Host Interface Component 104. In the illustrated embodiment, HIC 104 may include, for example, Modem Interface (MI) 210; Transmit and Receive Signal Processors (TSP 221 and RSP 222); Modem Side Barrier Interface circuit (MSBI) 230; Modem Side Barrier Interface Finite State Machine (MSFSM) 250; and Clock Generation Circuit (CLKGEN) 240.

MI 210 may provide a bi-directional data port that can be configured to support most DSP's or similar processing units with which it may interface. MI 210 provides an interface between Host 150 and DAA 100. In the present illustration, only representative interface signals are shown.

Signals Tx_D 203 and Rx_D 204 may be configured as internal signals of a predetermined width (e.g., 16 bits wide). In this illustration, Tx_D 203 is input to Transmit Signal Processor (TSP) module 221 and Rx_D 204 is output from Receive Signal Processor (RSP) 222. In addition, clock signals TRSPCLK 205 provides clocking for module TSP 221 and module RSP 222. In addition, clocks to MSFSM 250 and MSBI 230 may be derived within CLKGEN 240 from the system clock (SysCLK 206).

TSP 221 receives digital data, Tx_D 203, from MI 210, processes the digital data, and may serialize it via a simple parallel to serial converter or through an over-sampling quantizer (e.g., digital sigma-delta modulator) to generate transmit bit stream TxdBS 225, which is coupled to MSBI 230 for transmission over the barrier. The present invention is in no way limited in the mechanism by which the one-bit data stream TxdBS originates.

In one or more embodiments, TSP 221 may consist of a transmit interpolation filter (TIF) that takes in 16-bit data, for example, from MI 210 at a certain rate (e.g., 8 kHz), and a parallel to serial converter or a digital sigma-delta modulator. The TIF may up-sample (i.e., interpolate) the data to a desired rate (e.g., 16 kHz), and output a 16-bit (or other multi-bit) data stream. This 16-bit data stream may be immediately serialized and sent to MSBI 230 for transmission or, alternately fed to a digital sigma-delta modulator and thus converted to a serialized bit stream for transmission. The former has the advantage of reduced data rate across the barrier; however, any serialization method may be employed without departing from the spirit of the invention.

The serialized output TxdBS 225 from either the parallel to serial converter or a digital sigma-delta modulator (DSDM) is fed into MSBI 230 for time-division multiplexing with control data to form a transmit bit stream (TBS), which, in one or more embodiments, is double-balanced encoded (e.g., DC-balanced with respect to current and voltage drive to the transformer) prior to transmission across the barrier to LIC 108.

In the receive direction, information that is transferred over the barrier (e.g., using impedance modulation) from the LIC 108 to MSBI 230 is decoded and separated into data and status in MSBI 230. The data portion (RxdBS 226) may be fed to one or more digital filters in RSP 222. The digital filters may be synchronized so that there is one sample available at the desired output rate (e.g., 16 kHz).

The output of RSP 222, Rx_D 204, may be decimated output data (e.g. 16-bit wide) at the desired rate (e.g., 8 kHz). Rx_D 204 may then be transmitted to MI 210 for subsequent processing and transmission to Host 150.

MSBI 230 provides the interface functionality of the HIC with the isolation barrier for communication with LIC 108. In one or more embodiments, in addition to other functions, the MSBI 230 may manage all of the required signaling across the barrier by, for example: encoding the transmit bit stream (TxdBS 225) and control information (CTL) and transferring the encoded signal across the barrier; decoding the receive bit stream (RxdBS 226) and status information (STA) from LIC 108; and generating proper amplitude pulses to transfer power to LIC 108 when necessary. The MSFSM 250 is a state machine that controls the functions of MSBI 230 and generates the control signal, CTL, that is transferred across the barrier to LIC 108.

Figure 9:
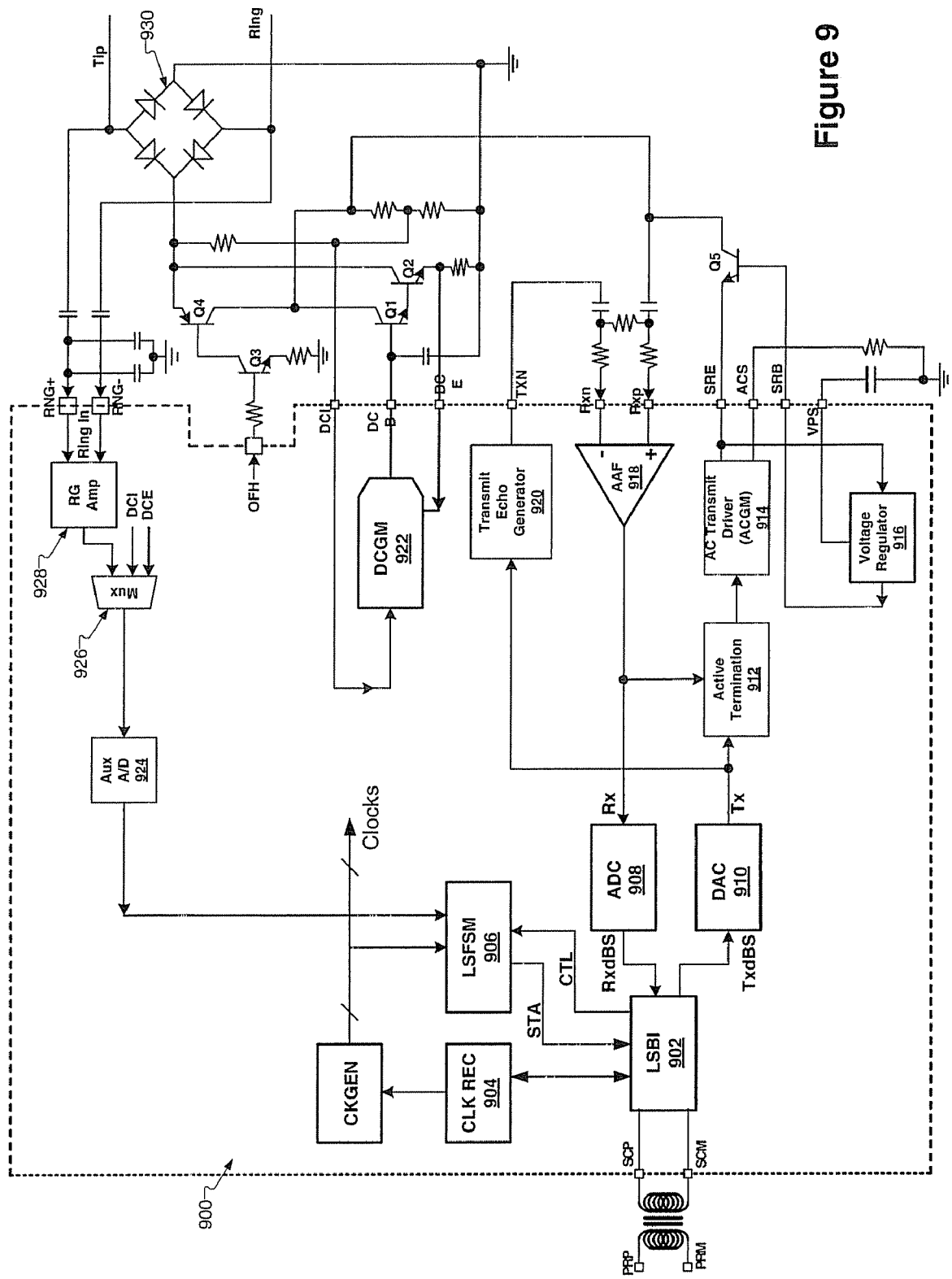
FIG. 9 is a block diagram of a Line Interface Component in accordance with an embodiment of the present invention.

Referring back to FIG. 1, the telephone line side of the DAA embodiment comprises LIC 108 and external circuitry 110. The functionality of LIC 108 and external circuitry 110 of one possible embodiment are further illustrated in FIG. 9. As illustrated, LIC 108 comprises circuitry enclosed in block 900. Other circuitry (not shown) may also be part of the external circuitry 110.

LIC 108 comprises Line Side Barrier Interface (LSBI) 902; Clock Recovery circuit (CLK REC) 904; Line Side Finite State Machine (LSFSM) 906; Analog-to-Digital Converter block (ADC) 908; Digital-to-Analog Converter block (DAC) 910; Active Termination circuit 912; AC Transmit Driver (ACGM) 914; Voltage Regulator 916; Anti-Aliasing Filter (AAF) 918; Transmit Echo Generator 920; DC Termination Circuit (DCGM) 922; Auxiliary Analog-to-Digital Converter (Aux A/D) 924; Multiplexer 926; and Ring Amplifier (RG Amp) 928.

In one embodiment, the analog signal from the telephone line (Tip and Ring) is conditioned through Rectifier 930 to eliminate any polarity issues. The positive terminal of Rectifier 930 is AC coupled through the Rxp input of block 900 to the positive terminal of AAF 918. As illustrated, AAF 918 may comprise one or more active and/or passive filters and amplifiers. The negative terminal, Rxn, of AAF 918 is AC coupled to output TXN of Transmit Echo Generator 920 for transmit echo cancellation. AAF 918 sums the receive signal, Rxp, with a portion of transmit signal, TXN, to reduce the transmit signal component in the receive path.

The analog output, Rx, of AAF 918 is coupled to ADC 908 for conversion to the receive data bit stream, RxdBS. The resulting high frequency one-bit receive data stream (RxdBS) may be sent to LSBI 902 for encoding and eventual transmission across the barrier to HIC 104, or alternately be further filtered by an additional digital filter such as Sin c^3 filter, then serialized and sent to LSBI 902 for transmission across the barrier.

DCGM 922 provides for appropriate DC termination characteristics by monitoring the input voltage from the telephone line (DCI), and the DC loop current sense (DCE).

On the transmit side, the transmit bit stream (TBS) received from across the barrier by LSBI 902 is first separated into transmit data bit stream (TxdBS) and control data (CTL). TxdBS is processed through Digital-to-Analog Converter block (DAC) 910 to generate the analog transmit signal Tx. The received signal from AAF 918 (e.g., Rx) is summed with the transmit signal in Active Termination block 912. AC termination is provided by sensing the receive signal at Rxp and feeding back an appropriate AC current generated within Active Termination Circuit 912 via AC Transmit Driver 914 to the collector of transistor Q5.

In one or more embodiments, an auxiliary analog to digital converter, Aux A/D 924, may be used to convey status information associated with the line condition. The tip and ring inputs may be coupled as differential inputs to amplifier 928, and then multiplexed with the line sensing signals, DCI and DCE, for conversion in Aux A/D 924. The output of Aux A/D 924 may then be coupled to Line Side Finite State Machine (LSFSM) 906 for transmission to HIC 104 as a status (STA) component of the receive signal. The host (i.e., Host 150) in communication with HIC 104 receives and interprets the status data to decide the appropriate action in controlling the DAA device.

Full-Duplex Signaling Over the Transformer

To understand the functions of MSBI 230 and LSBI 902, it is useful to discuss the general concept of transferring data bi-directionally and simultaneously (i.e., full duplex) across the isolation barrier in accordance with one or more embodiments of the present invention.

Figure 3A:
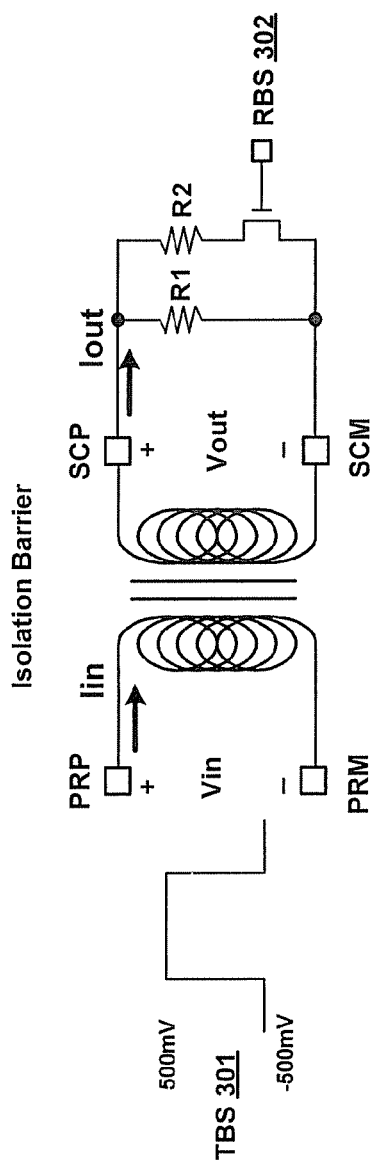
FIG. 3A is a circuit diagram of a transformer drive scheme in accordance with an embodiment of the present invention.
Figure 3B:
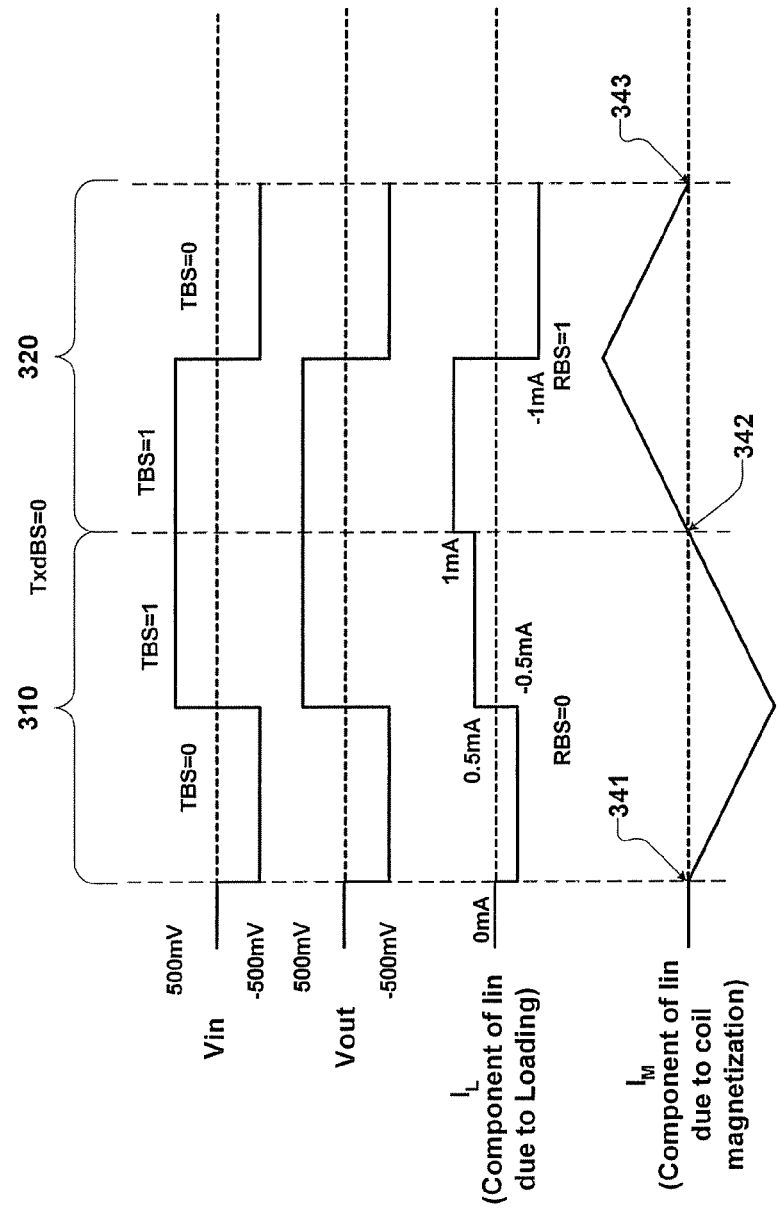
FIG. 3B is a signal diagram of the circuit of FIG. 3A, in accordance with an embodiment of the present invention.

FIGS. 3A and 3B provide illustration of the basic concept involved in the bi-directional transfer of data across a pulse transformer. FIG. 3A is an illustration of a transformer drive scheme in accordance with an embodiment of the present invention. FIG. 3B shows the transformer voltage and current values Vin, Vout, and Iin when the input data TxdBS="0" is doubly DC balanced via Manchester coding to yield "0110" TBS (first stage Manchester encoding: "0" becomes "01"; second stage Manchester encoding: "01" becomes "0110") and the receive data RBS transitions from "0" to "1" at the midpoint of the data period. In this illustration, PRP and PRM are the positive and negative terminals on the primary side of the pulse transformer, respectively. Similarly, SCP and SCM are the positive and negative terminals on the secondary side of the pulse transformer, respectively.

In operation, transmit data, in the form of input voltage Vin, is driven across the primary side of the transformer. Assuming a 1:1 winding ratio (though other winding ratios may be used as well), mutual inductance causes the input voltage to be induced across the output terminals of the secondary as Vout. As a consequence, output current Tout flows through the loading resistor R1 (e.g., 1 kΩ), assuming the switch on R2 is open (i.e., off). Since magnetic flux in a transformer cannot change immediately, input current Iin will flow into the primary side simultaneously.

By turning on the switch controlled by RBS 302 (see portion of waveforms in FIG. 3B labeled 320), and hence placing resistor R2 in parallel with resistor R1, the load impedance changes to the equivalent impedance of two resistors in parallel. For example, if R1 and R2 are each 1 kΩ, then the equivalent impedance is 0.5 kΩ. Load-dependent components of Tout and Iin also change as the impedance changes. For instance, if the load current, $I_L$, is 0.5 milliamps when driven by +0.5 v across the primary ports with only R1 as the load impedance, then the load current will double to 1.0 milliamps when R2 is switched on (given R1=R2=1 kΩ). Thus, if the load-dependent portion of Iin could be separated out from the total current Iin, it would form a basis for detecting the impedance changes on the primary side of the barrier and extracting the receive data (RBS 302) responsible for those changes (i.e., by controlling the switch).

In operation, Iin is composed of a magnetizing inductance component and a load current component. For the detection of impedance modulation, it is possible to isolate the component of Iin due to load impedance, $I_L$, from the component of Iin due to the magnetizing inductance, $I_M$. One or more embodiments of the invention facilitate isolation of the loading current from the magnetizing current by using a transmit data encoding scheme that is double DC balanced, i.e., DC balanced in both current and voltage. Double DC-balancing of the transmission signal induces predictable behavior in the magnetizing inductance current, such that the magnetizing inductance current is near zero at specific times. For example, in FIG. 3B, $I_M$ approaches zero value at points 341, 342 and 343 (e.g., at the end of each double-balanced data period).

Figure 4:
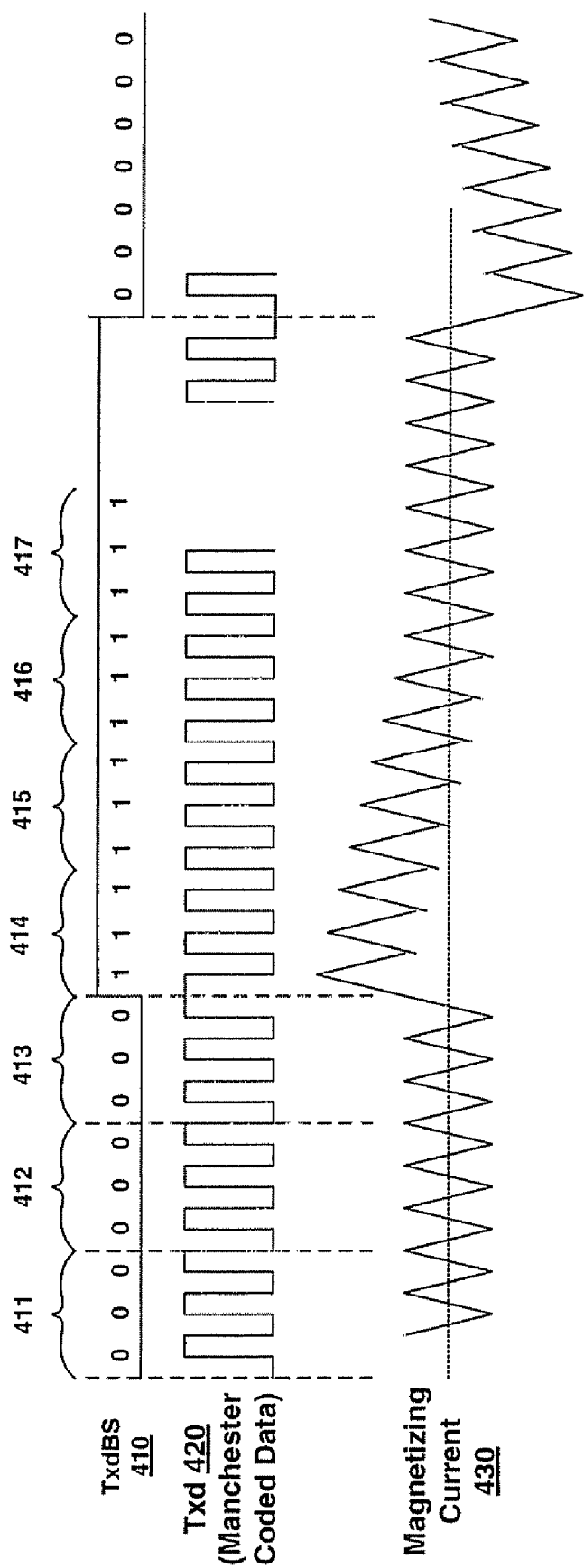
FIG. 4 is a signal diagram illustrating the effect of a single-balanced data signal (e.g., by 1-bit to 2-bit Manchester encoder) on magnetizing current.

FIG. 4 provides an example of a transmit data stream that is not double-balanced, with the corresponding magnetizing current. In this example, transmit data TxdBS 410 is Manchester encoded (single balanced) to generate coded data Txd 420, which is driven across a transformer. In this illustration, the magnetizing current 430 at the end of each of the Manchester periods is affected by the change in data pattern and may vary from one Manchester period to the next as shown. For example, at the transition from data sequence 413 to data sequence 414, the magnetizing current, because of its integrating behavior, rises well above the DC balance point for current. The perturbation in DC current value decays toward zero over time until perturbed again by another non-double-balanced data sequence. This makes the process of isolating the load current from magnetizing current more difficult because the value of the magnetizing current is unpredictable.

To make magnetizing current predictable, the transmit signal may be doubly DC balanced prior to transmission across the transformer. Balancing the transmit data signal in both current and voltage may be established, for example, by applying multiple single-balanced encoding processes to the transmit data (in sequence or otherwise). For example, Manchester encoding (i.e., 1b/2b) applied twice to the transmit signal will result in a double-balanced data stream. In other embodiments, a single encoding process may be implemented that provides DC balancing of both current and voltage characteristics. The benefit of this encoding is that the magnetizing current, $I_M$, returns to zero at the end of every Manchester period.

In accordance with one embodiment of the invention, this facilitates detection of the load current, $I_L$, by sampling Iin at specific points in time when $I_M$ is near zero (e.g., near the transition between each Manchester period).

In accordance with another embodiment of the invention, the predictable nature of magnetizing current $I_M$ allows for generation of a corresponding cancellation current at the primary of the transformer, such that the load-dependent current $I_L$ may be sampled substantially free of the influence of the magnetizing inductance current.

The impact of specific balancing block codes on transmission bandwidth, circuit complexity, and decay time of the encoded signal may be considered in selecting a particular encoding scheme. For instance, using two Manchester encoders (1-bit to 2-bit encoding) in series would result in the use of four times the original transmission bandwidth. In contrast, using a 7b/8b (i.e., 7-bit to 8-bit) encoder would be more bandwidth efficient, but may result in an unnecessarily complex circuit. In one or more embodiments of the present invention, a DC balanced 3b/4b encoder or a Manchester encoder is applied in series with another Manchester encoder to provide predictable magnetizing current with relatively moderate increases in bandwidth.

Figure 5A:
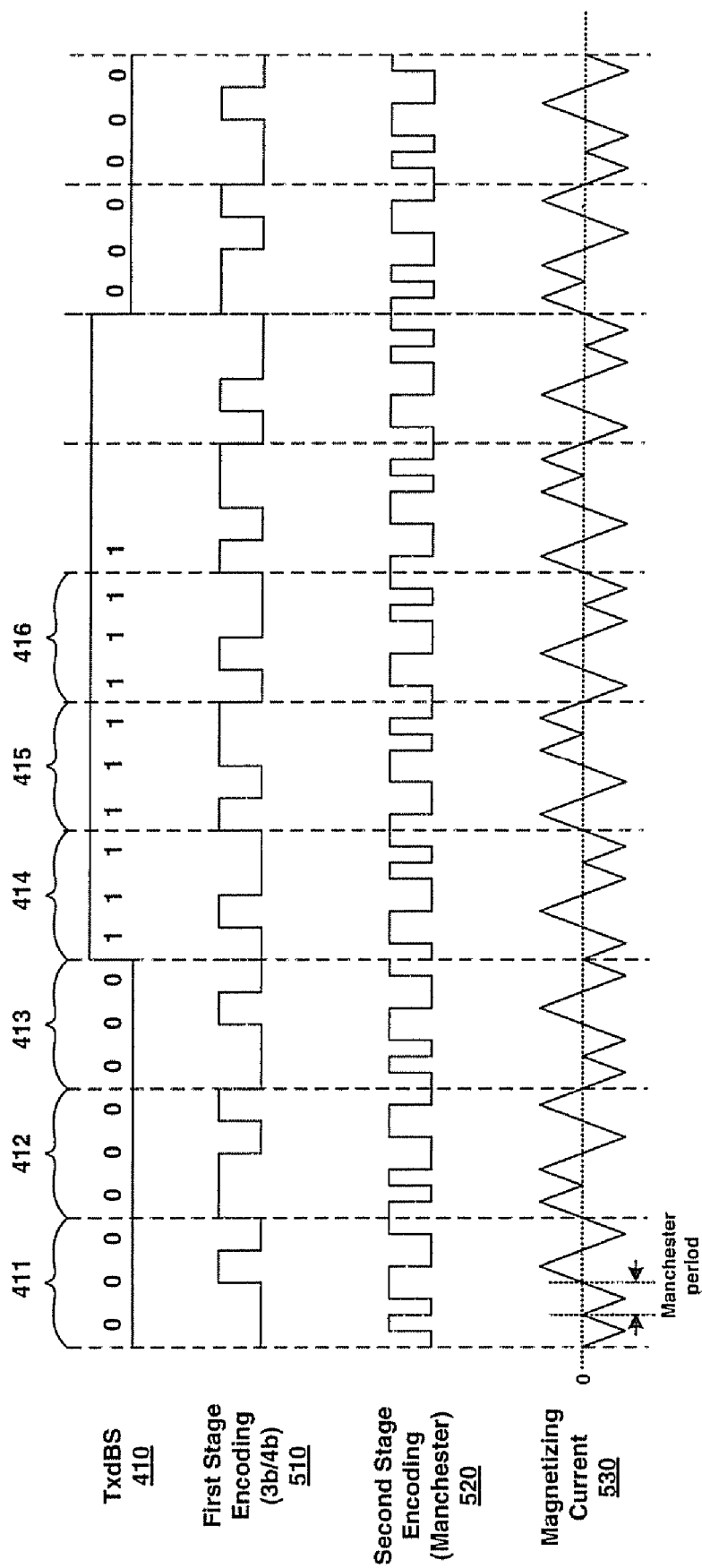
FIG. 5A is a signal diagram illustrating the behavior of the magnetizing current after transmit data is first processed through a 3-bit to 4-bit encoder followed by a Manchester encoder in accordance with an embodiment of the present invention.

FIG. 5A is an illustration of the behavior of the magnetizing current after TxdBS 410 is processed through a 3-bit to 4-bit encoder in accordance with an embodiment of the present invention. In this illustration, a DC-balanced 3-bit to 4-bit encoding scheme is used in the first stage (i.e., waveform 510), followed by a Manchester encoding second stage (i.e., waveform 520). This combination of encoding schemes results in the magnetizing current shown in waveform 530, which returns to zero at the end of each Manchester period.

A 4-bit data scheme has only six code words available that are DC balanced as follows: "0011"; "0101"; "0110"; "1001"; "1010"; and "1100". Thus, in the 3-bit to 4-bit encoding scheme of an embodiment of the present invention, these six balanced code words are assigned the values from one ("001") through six ("110") of the three input bit combinations. The remaining two input words, zero ("000") and seven ("111") are encoded to alternate between two unbalanced 4 bit words that average to DC-balanced words, e.g., "000" may be encoded to alternate between "0010" and "1101", while "111" may be encoded to alternate between "0100" and "1011".

Figure 5B:
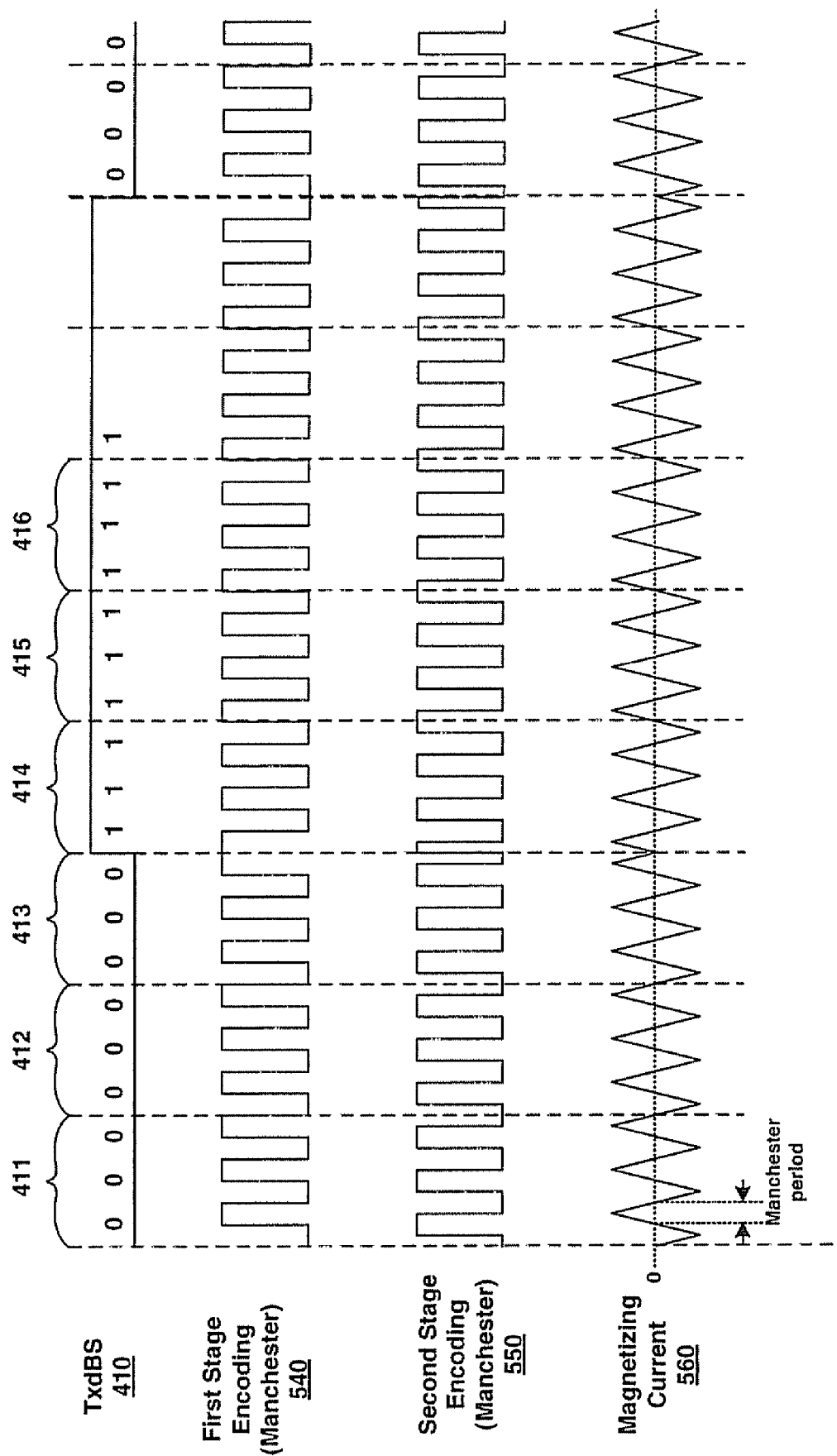
FIG. 5B is a signal diagram illustrating the behavior of the magnetizing current after transmit data is first processed through a first Manchester encoder (1b/2b) followed by a second Manchester encoder in accordance with an embodiment of the present invention.

FIG. 5B is an illustration of the behavior of the magnetizing current in another embodiment after TxdBS 410 is processed through two layers of Manchester encoding. In this illustration, a DC-balanced 1-bit to 2-bit encoding scheme is used in the first stage (see waveform 540), followed by a Manchester second stage (see waveform 550). As in the 3b/4b case, the magnetizing current is predictably zero at the end of each Manchester period independent of the raw transmit data values, as shown in waveform 560.

As waveform 530 illustrates, the encoding of each three-bit group (411, 412, 413, 414, 415, and 416) of transmit data to a DC balanced four bits results in a balanced and predictable magnetizing current 530—i.e., zero at the end of each Manchester period. Thus, the transformer input current Iin sampled at the end of every Manchester period will ideally be equal to $I_L$, the load current. Because load current can be detected by sampling the primary side current, Iin, at prescribed times, it is possible, in one or more embodiments of the invention, to communicate receive data using modulation of load impedance on the secondary of the transformer.

Modem Side Barrier Interface

Figure 6:
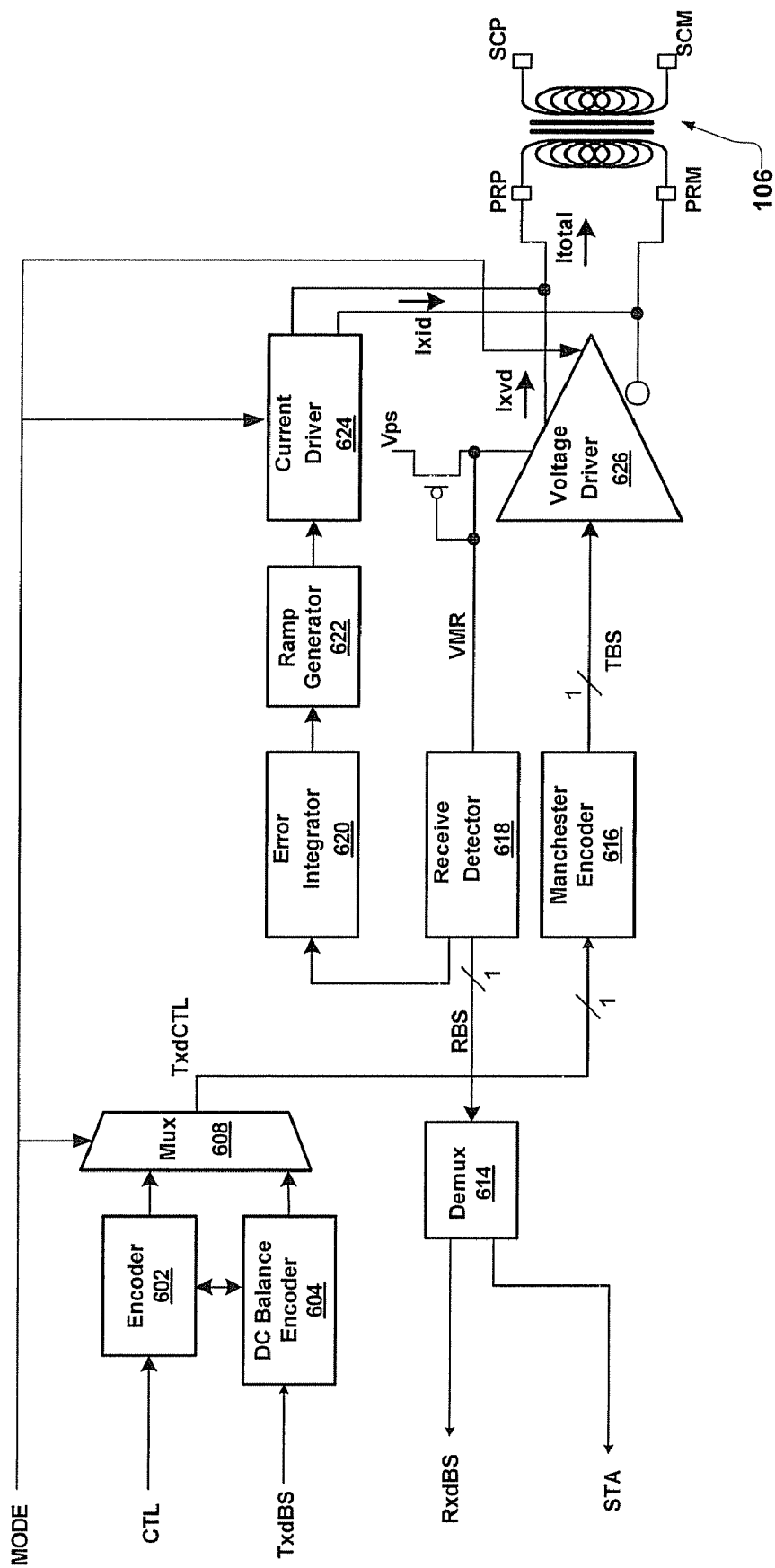
FIG. 6 is block diagram of a Host Side Barrier Interface in accordance with an embodiment of the present invention.

Now referring back to MSBI 230 of the DAA circuit example, FIG. 6 illustrates one embodiment of a Modem Side Barrier Interface. As shown, MSBI 230 may comprise Control Encoder block 602; DC Balance Encoder block (e.g., 3b/4b, Manchester, etc.) 604; Multiplexer (Mux) 608; Demultiplexer (Demux) 614; Manchester Encoder 616; Receive Detector 618; Error Integrator 620; Ramp generator 622; Current Driver 624; and Voltage Driver 626.

In this example, transmit data, TxdBS, is first DC-balance encoded (e.g. by either 3b/4b encoding and then serializing, or directly serializing via Manchester encoder) at block 604. Encoding increases the rate of the transmit data. For example, assuming the data rate of the transmit bit stream, TxdBS, is at 256 kbps, the actual data rate across the barrier, after two layers of Manchester encoding, is 256×4=1.024 Mbps, or after 3-bit to 4-bit conversion in series with Manchester encoding, 256×4/3×2=683 kbps.

In one embodiment, an AC power signal may be transmitted over the isolation barrier to LIC 108 from HIC 104 in special power frames that are time division multiplexed with data frames carrying the TxdBS data stream. The power frame may consist of, for example, enhanced magnitude voltage pulses that may be rectified and converted to a DC power source on the line side of the barrier. The power signal is doubly DC balanced at the point it is driven across the transformer, and, in one or more embodiments, may be utilized as a channel for control information.

In the embodiment of FIG. 6, composite signal CTL is the power signal modulated by control data. For example, when transfer of control data is necessary, the control data bit (i.e., CTL) may be encoded as follows: "0" may be encoded as "xx0101xx" and "1" may be encoded as "xx1010xx" in block 602 (where "xx" represents "don't care" bit values that are allowed to vary as long as double DC balancing is maintained). The resulting encoded CTL data and TxdBS data are time-division multiplexed in Mux 608 to generate TxdCTL, which is subsequently Manchester encoded in block 616 to generate the transmit bit stream, TBS. Transmit bit stream TBS is driven across the barrier by Voltage Driver 626.

Figure 7A:
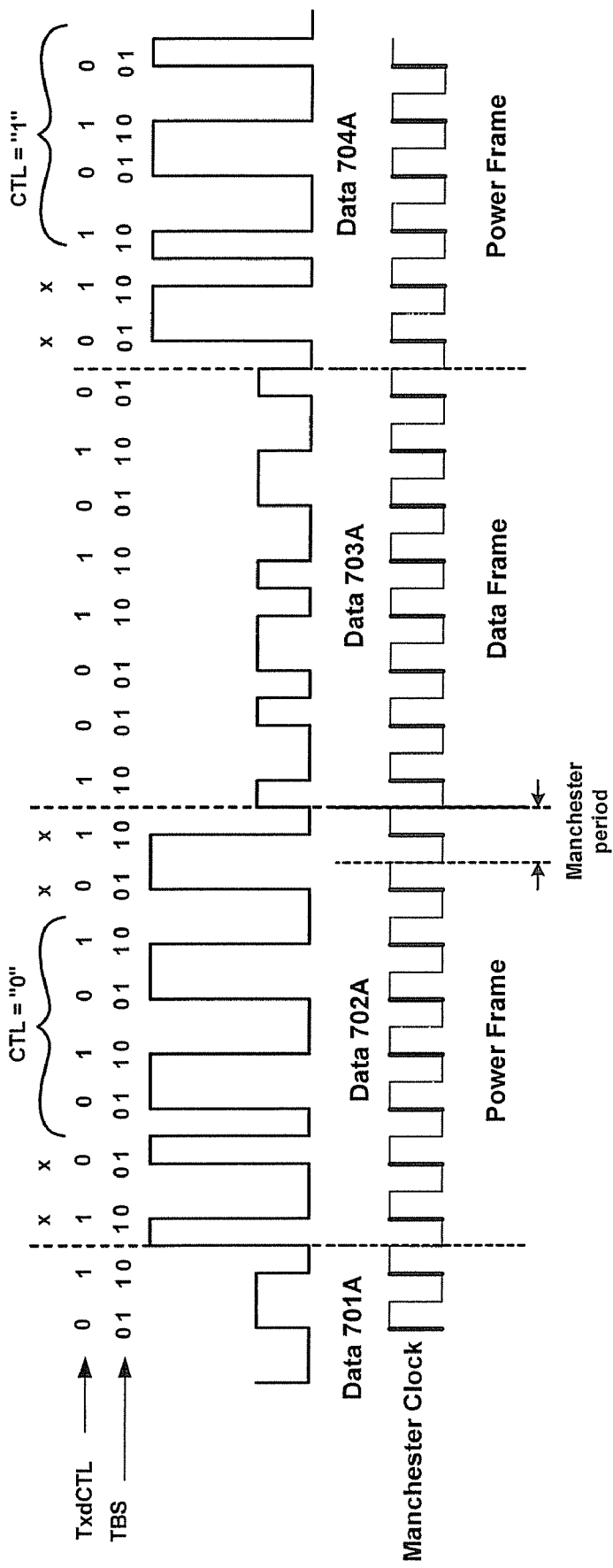
FIG. 7A is a signal diagram illustrating encoding of control and data in accordance with an embodiment of the present invention.

FIG. 7A is an illustration of encoding control and transmit data as seen across the primary side of the barrier in accordance with an embodiment of the present invention. It consists of power frames (702A and 704A) and data frames (701A and 703A). In the illustrated embodiment, each frame consists of eight Manchester periods. Each frame is thus capable of transferring four bits of raw data or eight bits of DC-balanced data (as a result of 1b/2b Manchester encoder or a 3b/4b encoder), prior to Manchester Encoder 616.

Control signal, CTL, may be time-division-multiplexed with the transmit bit stream (TxdBS) for transmission across the barrier to LIC 108 from the HIC 104. In a preferred embodiment, each power frame is assigned one value of CTL bit as shown in FIG. 7A. In block 602, CTL="0" may be encoded as "xx0101xx" and CTL="1" may be encoded as "xx1010xx". It should be clear to those skilled in the art that more than a single bit of CTL information may be transferred across in one power frame. The resulting encoded CTL data and TxdBS data are time-division multiplexed in Mux 608 to form the composite bit stream, TxdCTL, which is subsequently Manchester encoded in block 616 before being driven across the barrier by Voltage Driver 626. As illustrated, Data 701A represents data to be transmitted; Data 702A represents a control value of "0"; Data 703A represents data to be transmitted; and Data 704A represents a control value of "1".

As illustrated in FIG. 7A, for an embodiment using a 3b/4b encoder, one bit of control data and six raw (uncoded) transmit bits (equivalent to eight coded bits) are alternately transferred across the barrier, the effective control data transfer rate is one-sixth the rate of the transmit bit rate. In another embodiment wherein the first stage encoder is a 1b/2b encoder, one bit of control data and four raw (uncoded) transmit bits (equivalent to eight coded bits) are alternately transferred across the barrier, the effective control data transfer rate is one-fourth the rate of the transmit bit rate.

Figure 7B:
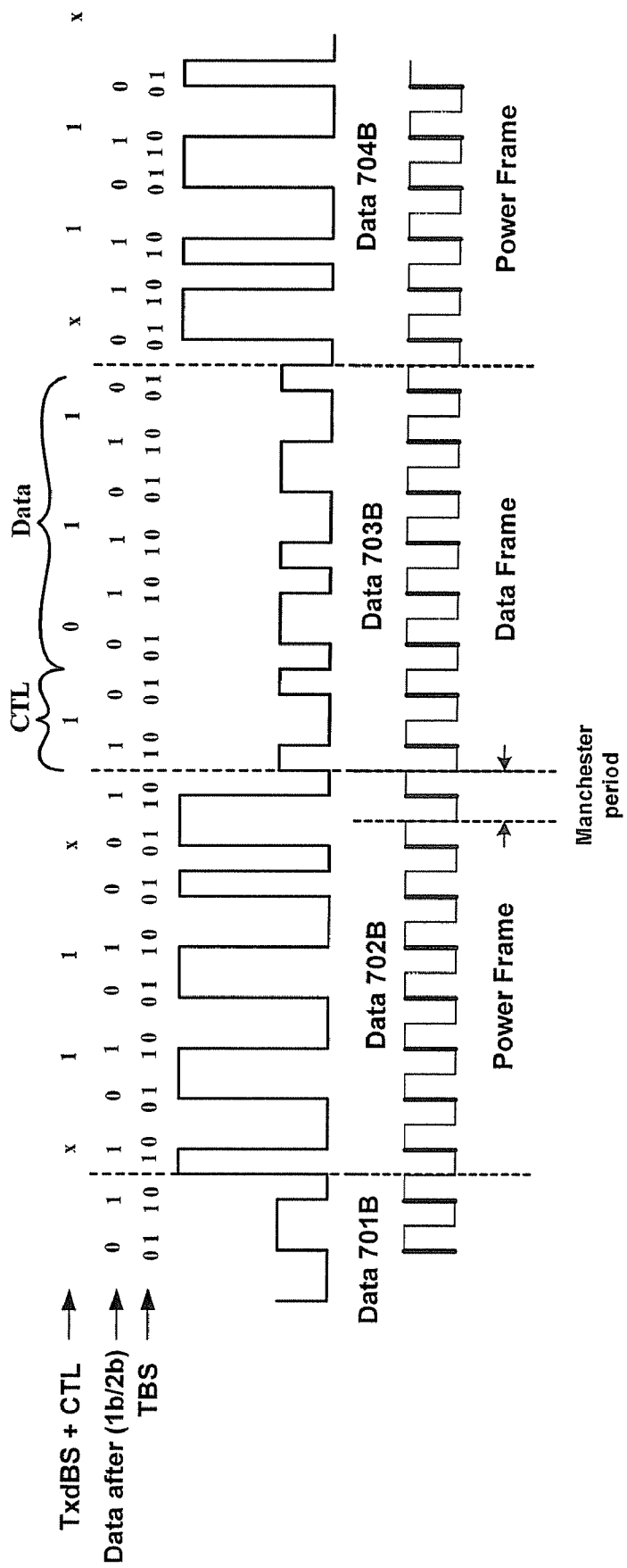
FIG. 7B is a signal diagram illustrating encoding of control and data in accordance with another embodiment of the present invention.

Alternately, FIG. 7B shows that CTL information can be embedded in the Data frame itself instead of the power frames if excess bandwidth exists within the data frames. In this embodiment, 1b/2b encoder as the first layer of encoding is used in which one bit of control data and three (uncoded) bits are alternately transferred across the barrier. The effective control data transfer rate is one third the rate of the transmit bit rate.

As is illustrated in FIGS. 7A and 7B, power may be transferred from the Host-Side to the Line-Side in a burst mode, i.e., alternating between power pulses and data pulses. The MODE signal (see FIG. 6) is used to indicate if the frame to be transmitted is a data or a power frame. In the embodiment of illustrated in FIG. 7A, the signal CTL is encoded into the phasing of the power frame and as such the MODE signal controls Multiplexer 608 as well as the operation of the transmit voltage driver 626. Note that in the embodiment illustrated in FIG. 7B, the MODE signal need not control MUX 608 since the CTL signal is phase with the data frame.

The MODE signal controls whether voltage driver 626 is generating power pulses or data pulses. Additionally, the MODE signal may enable current driver 624 during the Data frame to generate the replica of the magnetizing inductance current, which is provided to the transformer primary, such that voltage driver 626 only needs to source the load current (i.e. current dependent on the load impedance connected across the secondary of the transformer). Thus, current driver 624 is disabled during power frames so that voltage driver 626 provides all the current demand on the primary side of the transformer, which mostly consists of current used to power LIC and the magnetizing inductance current into the transformer primary.

By differentiating between power and data modes, the voltage level during power mode may be significantly greater than the voltage level during data mode to meet the power requirements of the LIC 108. Thus, an embodiment of the present invention uses a dual mode voltage driver circuit 626 which transfers the proper voltage (e.g. 3 Volts) during power burst and switches to communicate at the proper voltage level for data transfer (e.g. 0.5 Volts), during data mode.

Figure 8:
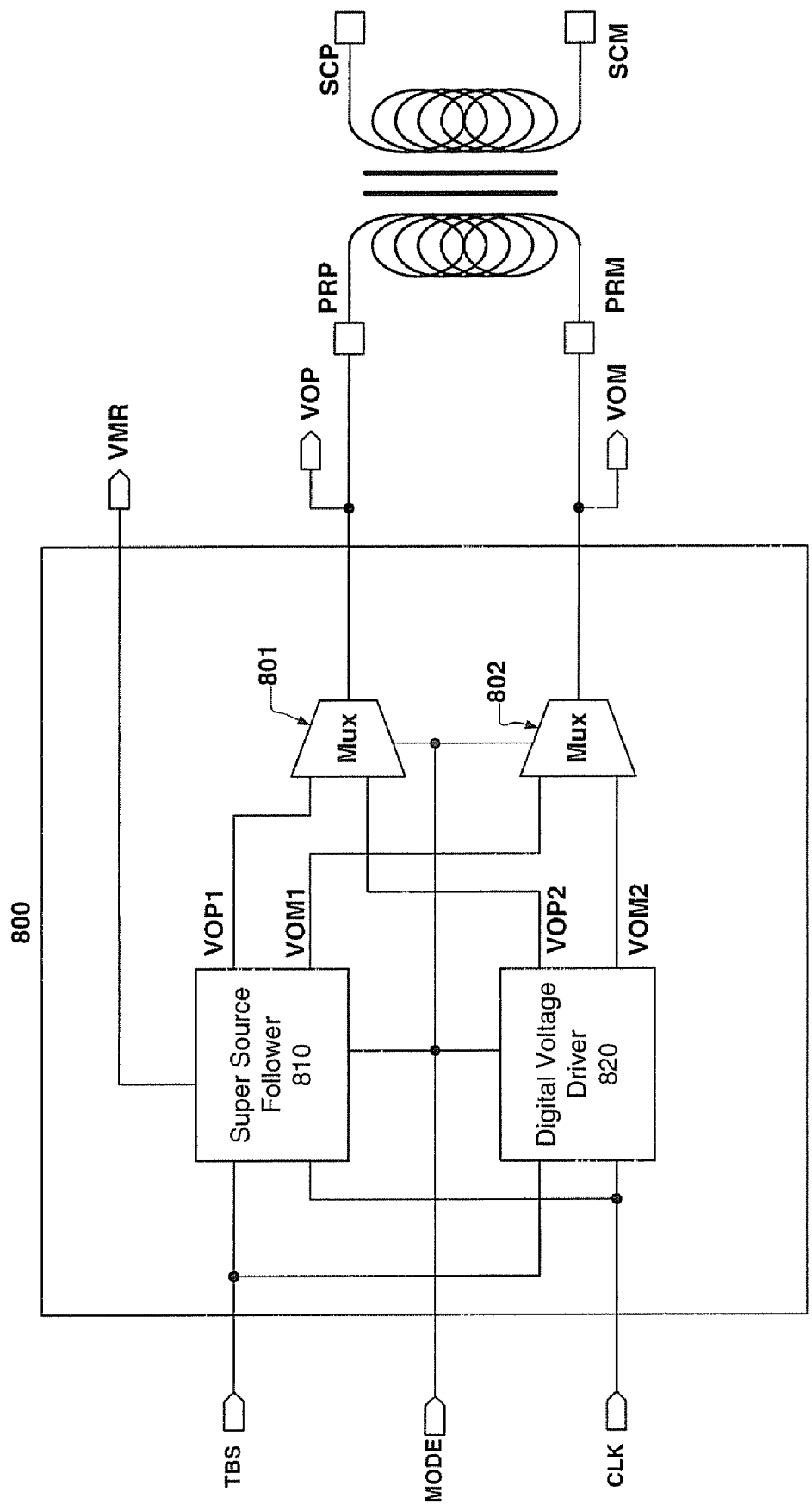
FIG. 8 is a functional illustration of a voltage driver circuit in accordance with an embodiment of the present invention.

In one embodiment, Voltage Driver 626 uses a simple low impedance digital driver to send the power burst at the desired voltage level and uses a super source follower circuit to send the data pulses, which are lower level voltage pulses. During the data frame, the current sourced by the voltage driver (i.e. 626) can be made available as an input to the servo loop comprising the magnetization current cancellation circuit such that it can be used to detect the receive data, RBS, that modulates the load impedance across the secondary of the transformer. FIG. 8 is a functional illustration of a voltage driver circuit in accordance with an embodiment of the present invention.

As illustrated, voltage driver 800 comprises Super Source Follower 810 and Digital Voltage Driver 820. The differential voltage outputs of Super Source Follower 810 (i.e. VOM1 and VOP1) and Digital Voltage Driver 820 (i.e. VOM2 and VOP2) alternately produce the transformer drive voltages of VOM and VOP, for instance, through MUX 801 and MUX 802.

In one or more embodiments of the present invention, MUX 801 and 802 are actually summing nodes and the source switching is performed within Super Source Follower 810 and Digital voltage Driver 820. Thus, Digital Voltage Driver 820 places its outputs, VOM2 and VOP2, at high impedance while Super Source Follower 810 is driving the transformer with its outputs, VOM1 and VOP1. Alternately, Super Source Follower 810 places its outputs, VOM1 and VOP1, at high impedance while Digital Voltage Driver 820 is driving the transformer with its outputs, VOM2 and VOP2.

Voltage VOM is coupled to the negative terminal, PRM, of the transformer, and voltage VOP is coupled to the positive terminal, PRP, of the transformer. In addition to the transformer drive voltages, Super Source Follower 810 also generates current minor voltage, VMR, as output. VMR reflects the load current impressed across the transformer secondary. As illustrated in FIG. 6, voltage VMR is mirrored back as load current and processed in Receive Detector 618 to generate the receive data stream, RBS, and the error signal to close the magnetizing inductance current cancellation loop.

Figure 11:
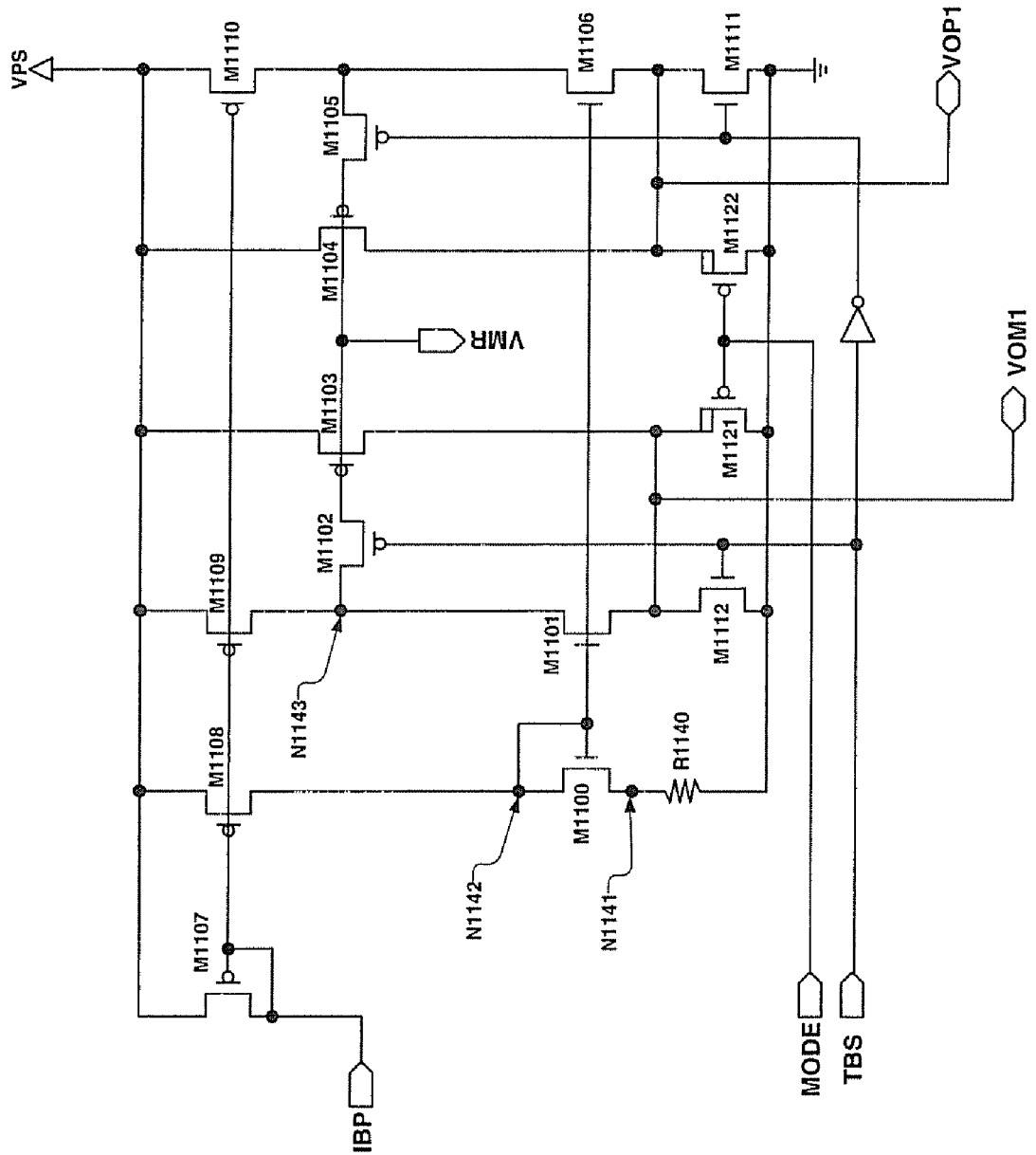
FIG. 11 is an illustration of a super source follower driver in accordance with an embodiment of the present invention.
Figure 12:
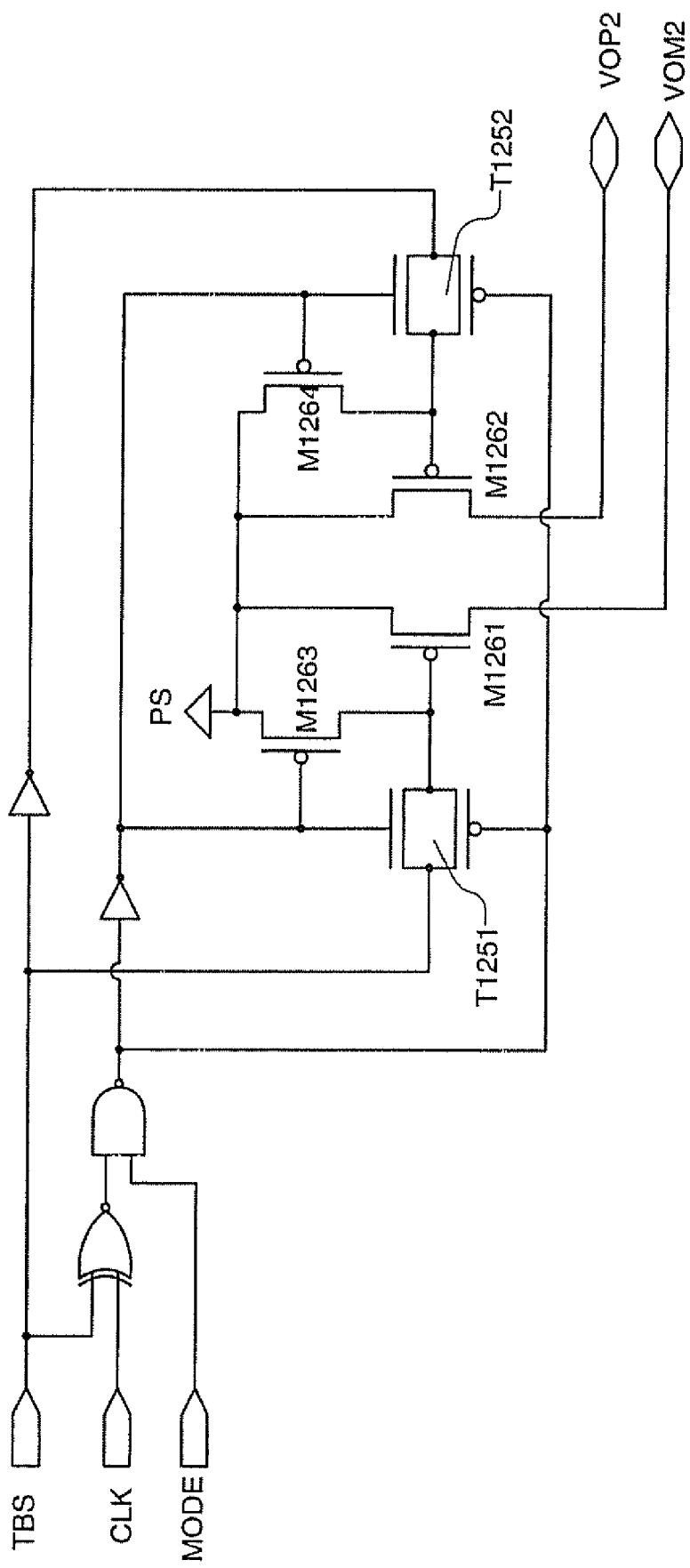
FIG. 12 is an illustration of a digital voltage driver in accordance with another embodiment of the present invention.

Detailed implementation of an embodiment of Super Source Follower (i.e. 810) and the Digital Voltage Driver (i.e. 820) are illustrated in FIGS. 11 and 12, respectively. As illustrated in the Super Source Follower circuit of FIG. 11, the outputs VOM1 and VOP1 are at the source of device M1101 and M1106 (i.e. source followers). There are two complementary super source follower circuits: one for the negative drive and one positive drive (i.e. differential drives) of the isolation barrier transformer. The super source follower circuit for the negative drive voltage, VOM1, comprises the feedback loop through node N1143 (i.e. drain of M1101) connected to gate of device M1103 through switch M1102. And the super source follower circuit for the positive drive voltage, VOP1, comprises the feedback loop through the drain of M1106 connected to gate of device M1104 through switch M1105. The two super source followers are tied together at the gates of M1103 and M1104, and, regardless of which one of the two super source followers is in use, the voltage reflective of the load impedance on the secondary manifests itself at VMR. This has an effect of rectifying the load current demanded by the transformer. That is, if the loading on the secondary is fixed, VMR generated would be independent of transmit data, TBS.

Devices M1121 and M1122 act as clamping devices to keep the drive voltages approximately at the maximum level (e.g. approximately 0.5V) during data mode. As illustrated, these devices are disabled during power transfer mode, i.e., when the MODE signal is true.

During operation, the current through diode connected device M1100 is equal to a constant current that is provided as input current at IBP. The constant current at IBP is typically generated by forcing a resistor (R) across a Bandgap voltage (Vbg) such that it (=Vbg/R) is fairly insensitive to process, temperature and supply voltage variations. When this current enters at IBP into M1107, it is mirrored via M1108 into M1100, thus developing a voltage at N1141 that is roughly equal to a portion of the Bandgap voltage (i.e. Vbg×R1140/R). Since M1109 and M1110 are scaled relative to M1108 the same way as M1101 and M1106 are scaled relative to M1100, the voltage at node N1141 will nominally equal the source voltage of M1101 (i.e. VOM1) or M1106 (i.e. VOP1), whichever is enabled by the transmit bit stream, TBS. Thus, in this example, if the voltage at node N1141 is 0.5V, then VOP1 or VOM1 will equal 0.5V, whichever is enabled.

Only one of the two super source followers is enabled at any given time and this is controlled by the transmit bit stream, TBS. For instance, when TBS=0, M1102 is turned on and M1105 is turned off such that VOM1 is at 0.5V and VOP1 is at ground (i.e. 0V). Alternately, when TBS=1, M1105 is turned on and M1102 is turned off such that VOP1 is at 0.5V and VOM1 is at ground (i.e. 0V). In short, if TBS=0, the transformer primary is driven such that PRP−PRM=−0.5V. And, if T×D=1, the transformer primary is driven such that PRP−PRM=+0.5V.

During the power transfer, neither of the source followers participates in driving the transformer, as outputs, VOM1 and VOP1, are placed in high impedance by virtue of the voltage driver forcing VOP1 (=VOP2) or VOM1 (=VOM2) to high voltage (e.g., 3 v) while the clamp devices M1121 and M1122 are disabled.

When driving the primary of the transformer in data mode, the voltage driver must provide current demanded by the loading on the secondary. For illustration, assuming the use of transformer with turn-ratio of 1:1 and the load impedance connected across the secondary of 0.5 k Ohms. Further, assuming that TBS=1. Then, VOP1 should ideally be driven to 0.5V and VOM1 to 0V, while providing the load current of 0.5V/0.5 kohm=1 mA. Without the feedback loop active (i.e. M1105 off), M1106 will attempt to deliver 1 mA of load current to VOP1 but since it can only source what is available from M1110 (e.g., 0.5 mA), both the source and the drain of M1106 will sag, thus failing to provide 0.5V at VOP1, as required. However with the feedback loop closed (i.e., M1105 turned on), M1104 reacts, with its gate (also the drain of M1106) sagging, by increasing its drain current until it can make up whatever current deficiency exists (i.e. 1 mA−0.5 mA=0.5 mA). Since this loop forces VOP1 to 0.5V, independent of the load current demanded by the transformer, this super source configuration results in a voltage driver having low source impedance. The actual source impedance may be calculated by dividing the native source impedance of M1106, which is 1/Gm (where Gm is the transconductance of M1104 in saturation mode), by the loop gain of the feedback loop. After activating the super source follower feedback loop through switch M1105, the source impedance drops within the band of the loop by 1/Gm divided by the loop gain.

Since M1104 makes up for the load current deficiency, the current through M1104 provides an estimate for the load current required by the transformer. Thus, a sampling of the current as manifested by VMR, at appropriate times will provide information regarding the termination (i.e. load) impedance.

The above illustration assumes that voltage driver 626 only needs to provide load dependent current while current driver 624 provides all of the magnetizing current required by the transformer primary. However, if the current generated by current driver 624 does not match exactly the magnetizing current demanded by the transformer, the voltage driver will naturally make up the difference. It should be noted that the double DC-balanced encoding of the transmit data (via 604 and 616) causes the magnetizing current to be ideally zero at specific times. Thus even with imperfect cancellation of magnetizing current, VMR, sampled at appropriate times, will provide information on load impedance that is present across the secondary of the transformer. Obviously, if the cancellation is good, VMR will reflect load current at all times thus providing more options in detecting of receive data.

As discussed previously, the Super Source Follower 810 provides the drive voltage during data mode and the Digital Voltage Driver 820 provides the drive voltage during power mode. FIG. 12 is an illustration of a Digital Voltage Driver 820 in accordance with an embodiment of the present invention.

As illustrated, the digital voltage driver 820 comprises two complementary circuits: one for the negative voltage drive and the other for the positive voltage drive. The negative voltage driver comprises transmission gate T1251, device M1261, and device M1263. The positive voltage driver comprises transmission gate T1252, device M1262, and device M1264.

As illustrated, transmission gates T1251 and T1252 are turned OFF during data mode (i.e. MODE=0). In this mode, the gate of device M1263 and gate of device M1264 are held low thus turning on both devices and allowing the voltage from PS to disable device M1261 and device M1262. Thus, the outputs of digital voltage driver 820 (i.e. VOM2 and VOP2) are placed in high impedance state when MODE is equal to zero (i.e. data mode).

During power mode (i.e. MODE=1), transmission gates T1251 and T1252 are turned ON, devices M1263 and M1264 are turned OFF, and power from supply PS flows either to the output terminal VOM2 or VOP2 depending on the state of transmit data TBS. For instance, when TBS is high, device M1262 is turned ON because its gate voltage is low (i.e. inverse of TBS through transmission gate T1252), and power flows from PS to VOP2. In addition, device M1261 is turned OFF because its gate voltage is high (i.e. TBS through transmission gate T1251) thus output VOM2 is floating. In like manner, when TBS is false, device M1261 is turned ON and power flows from PS to VOM2; and device M1262 is turned OFF thus its output VOP2 is floating. In similar manner, when TBS is low, device M1261 is turned ON because its gate voltage is low (i.e. TBS through transmission gate T1251), and power flows from PS to VOM2. In addition, device M1262 is turned OFF because its gate voltage is high (i.e., the inverse of TBS through transmission gate T1252) thus output VOM2 is floating.

Thus, as illustrated, digital voltage 820 is tri-statable, that is, capable of operating to provide low voltage, high voltage, and high impedance states in each output terminal, VOM2 and VOP2.

The use of two different type circuitries, e.g., a super source follower 810 and digital voltage driver 820, to generate significantly differing levels of barrier drive voltages may cause peculiar issues when switching between modes. Most particularly, when the MODE signal transitions from one to zero the voltage drive presented to the transformer primary may deviate significantly from its ideal waveforms.

The configuration of the super source follower as presented in FIG. 11 allows for an easy sourcing of current but has no means to sink current other than the load current that manifests itself across the primary of the transformer. Thus, switching from the high of a power pulse (e.g. 3 Volts) at the end of power frame to the high of a data pulse (e.g. 0.5 Volts) at the beginning of data frame may result in the voltage drive to the transformer deviating from its ideal waveform. However, this particular problem can be circumvented by specially coding the boundaries between data and power frames.

For instance, a "Return-to-Zero" scheme may be imposed during the power-burst to data-burst transition to resolve this difficulty. "Return-to-Zero" means that any logical high drive (e.g. 3V) at either the transformer primary plus or minus terminal first returns to zero (e.g. 0V) before taking on the different data level (e.g. 0.5V) at the beginning of the data frame.

To accomplish the return to zero, the phasing of power pulses may be modified (since data pulses may not be altered) in such a way that the last bit (prior to the second layer of DC balance—pre-Manchester bit) of the power frame is matched to the first bit (prior to the second layer of DC balance—pre-Manchester bit) of the data frame. "0(1)," as the last bit in the power frame, becomes "01(10)" via Manchester coding, and "0(1)", as the first bit in the data frame, becomes "01(10)". Thus, the sequence "0101" (or "1010") saddles the power-to-data boundary. In all cases, a transition from high voltage of a power frame to high voltage of a data frame is avoided. Also, the first bit of the power frame is matched to the last bit of the data frame, so the sequence "0101" (or "1010") saddles the data-to-power boundary as well.

Referring back to FIG. 7A, it will be noted that the control data is embedded in the phasing of power pulses. Specifically, CTL=0 is encoded as xx0101xx and CTL=1 as xx1010xx. Thus, the two pairs of bits (denoted with "x") at the beginning and the end of the power frame can be altered freely with the exception that they still need to be DC balanced. For example, if the first data bit out of DC Balance Encoder 604 following the power frame is "0" (e.g. first bit of frame 1502 of FIG. 15A), this dictates, after the final Manchester Encoder, 616, a voltage drive of 0V to 0.5V at PRP and 0.5V to 0V at PRM. Thus, the last bit at the end of the power frame 1501 is matched with the first data bit and becomes "0" (e.g. 1511) which means the drive to PRP is 0V to 3V and the drive to PRM is 3V to 0V. To maintain the DC balance, the second to the last bit of the power pulses becomes "1" or 3V to 0V at PRP and 0V to 3V at PRM.

With this encoding, PRP is driven to 3V at the end of power frame and then upon entry to data frame first driven to 0V and then to 0.5V. Conversely, PRM is driven to 0V at the end of power frame and then upon entry to data frame first driven to 0.5V and then to 0V. Thus, both PRP and PRM are prevented from having to transition directly between 3V and 0.5V. Instead, there is a forced transition from 3V to 0V, which is easily accomplished by shorting PRP to ground via M1111 and PRM to ground via M1112, before the transition to 0.5V.

Alternately, if the first data bit following the power frame is "1", the last bit of the power frame is matched to it and becomes "1". To maintain the DC balance, the second to the last bit of the power pulses becomes "0". In this configuration, PRM transitions from 3V to zero volts before going to 0.5V.

Also, the first bit of the power frame following a data frame, e.g. 1503, is matched with the last bit of data frame 1502 (e.g. 1512). Thus, if as illustrated, the last data bit is a "1", then the first bit of the power frame is also set to "1" (the second bit of the power frame is set to "0" to maintain DC-balance). In this configuration, the PRM terminal will be forced to return to zero from 0.5V before driving to the power frame voltage level (e.g. 3V).

Alternately, if the last data bit "0", the first bit of the power frame is matched to it and becomes "0". To maintain the DC balance, the second to the last bit of the power pulses becomes "1". In this configuration, PRP transitions from 0.5V to zero volts before going to 3V.

In summary, pulses in a power frame are altered to ensure that its last bit (pre-Manchester bit) matches the first bit in a data frame and its first bit matches the last bit in a data frame, although the latter is not critical or necessary. Further the bits in the power frame next to the first and the last are made the compliment of the first and the last bits, respectively, to maintain DC balance prior to the final Manchester coding.

Because the encoding method described above results in two identical pre-Manchester bits in a row at the boundaries between data and power bursts, it may unnecessarily make the task of recovering clocking information difficult on the line side (LIC 108). For example, the raw data bits 1511 comprising the last bit of the Power burst 1501 and the first bit of Data burst 1502, and the raw data bits 1512 comprising the last bit of Data burst 1502 and the first bit of Power burst 1503, are matched thus creating two identical pre-Manchester encoded bits at the boundaries of power and data. As illustrated in waveform 1520, the irregularities at the boundaries result in un-evenly spaced transitions of the pulses thus providing a signal that is not easily usable for clock recovery.

Figure 15:
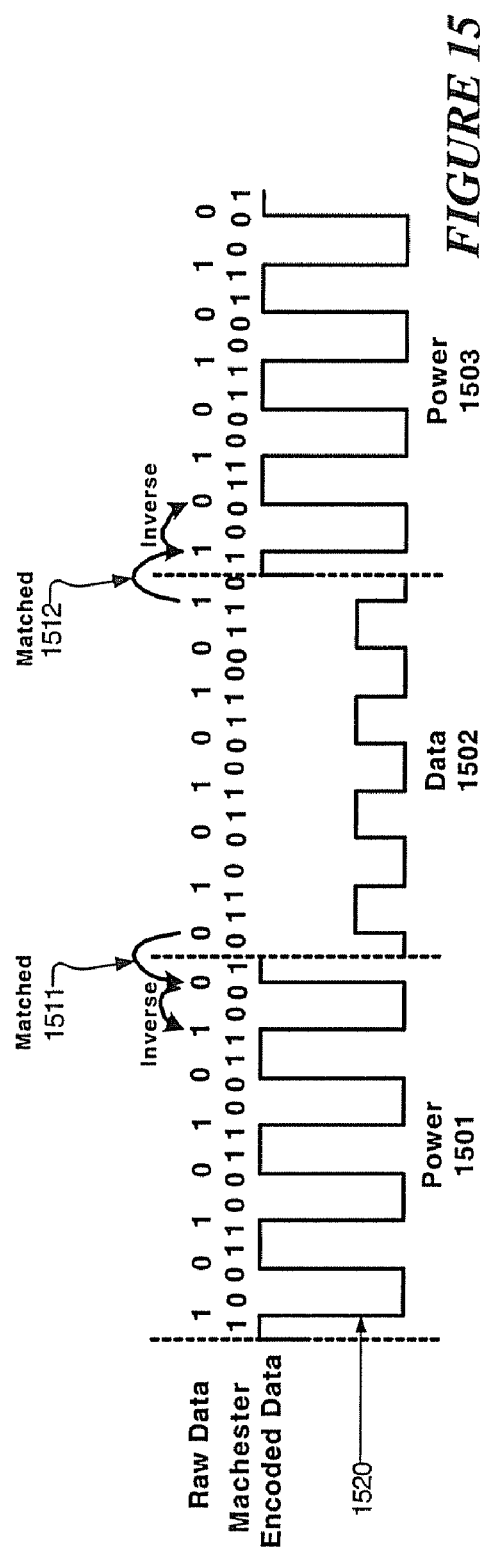
FIG. 15 is a signal diagram illustrating representative preamble pulses for clock recovery lock in accordance with an embodiment of the present invention.
Figure 16:
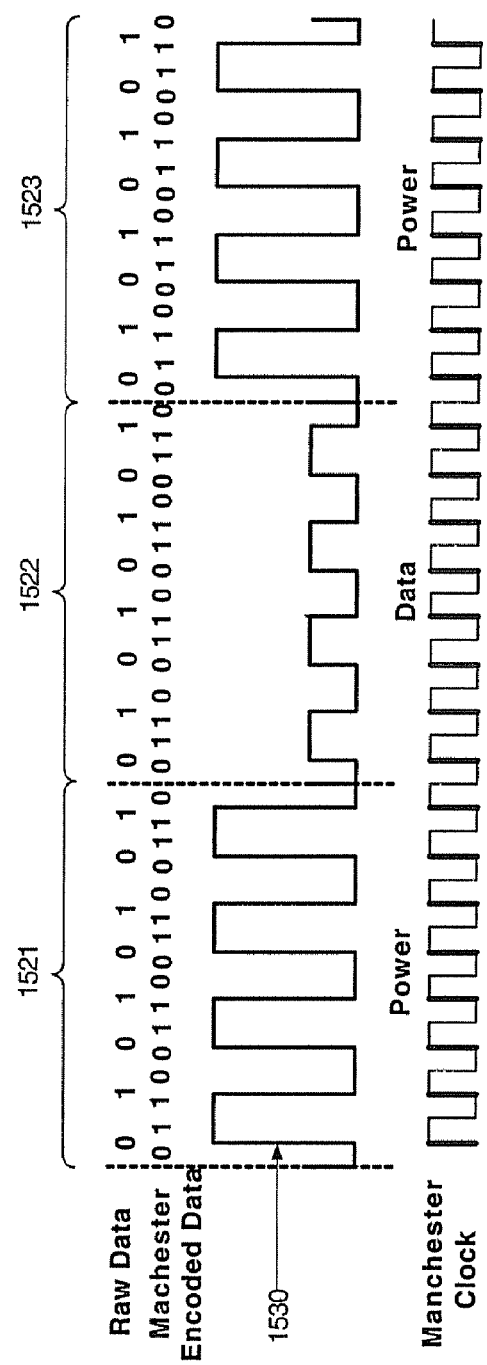
FIG. 16 is a signal diagram illustrating results of inversion of the preamble pulses for clock recovery in accordance with an embodiment of the present invention.

However, inverting the transmitted power burst pulses on the line side prior to clock recovery, resolves any issue caused by two identical pre-Manchester bits saddling the boundary. The resulting signal 1530 is illustrated in FIG. 15B wherein the signal transitions are equally and evenly spaced. The inversion is only needed for power burst pulses and only until the clock is recovered. Clock recovery is discussed in more detail below.

Referring back to FIG. 6, the receive data, RBS, may be decoded by isolating the transformer current, Itotal, into two components: $I_M$, the magnetizing current; and $I_L$, the load current (i.e., due to the transformer load impedance of R1 and R2). In accordance with an embodiment of the invention, a current feedback path comprising elements 618, 620, 622 and 624 may be implemented to generate a compensating current Ixid, which acts to cancel the magnetizing inductance current, $I_M$. The feedback loop forces Ixid to track $I_M$ so that the receive data may be detected and extracted from the load current $I_L$, which in this embodiment is sourced from (or sunk by) the voltage driver as input current Ixvd (i.e., if Ixid is substantially equivalent to $I_M$, then Ixvd will consist substantially of $I_L$).

As illustrated, Receive Detector 618 decodes the receive data and generates the loop error discriminant from signal VMR. Signal VMR, in one embodiment, is a voltage signal that is generated by forcing the rectified value of current Ixvd (i.e., |Ixvd|) of the voltage driver thru a diode connected PMOS device. VMR can then be conveniently used in a current minor configuration to regenerate error current within Error Integrator 620 for further processing.

VMR can be sampled at two different times to form an error discriminant. Since $I_M$ is known to be ideally zero at the end of the Manchester period and at its maximum in the middle of the Manchester period, VMR (that represents |Ixvd|) is sampled at those two instances, in one embodiment. Any difference that exists between the two samples represents a portion of magnetizing current $I_M$ that is not cancelled by the Ixid of the current driver 624, resulting in an error signal around which the servo loop may be closed to achieve Ixvd=$I_L$.

The digital input voltage signal comprises short spans of relatively constant voltage values, balanced around zero. Due to the integral relationship between input voltage and current in an inductor, the magnetizing inductance current may be characterized as a fixed-rate ramp toggling between upward and downward slopes as the input voltage signal toggles between digital (e.g., binary) voltage states. A compensating current equivalent to the magnetizing current may therefore be generated by a controllable current ramp generator.

In one embodiment, a ramp current is generated in block 622, and converted to hid in current driver block 624. The generated current, Ixid, feeds into the primary terminal of the transformer to cancel the magnetizing inductance current drawn by the transformer. Due to the operation of the feedback loop, current Ixid is adapted to be substantially equivalent to the magnetizing current, $I_M$, so that the current (Ixvd) sourced (or sunk) by voltage generator 626 is substantially equivalent to the isolated load current, $I_L$.

Thus, the receive signal Rxd (or RBS) may be decoded by sampling the current Ixvd (via sensing voltage VMR) at any time in the bit period, and comparing the magnitude of the sensed value against a threshold. The threshold may be derived, for example, from the average of the two sensed levels corresponding to the two known impedance values. Alternately, given that $I_L$ is substantially constant throughout each of the Manchester periods, $I_L$ can be integrated over the entire Manchester period to form a basis for receive detection. This will make the detection more robust against noise of the system. In particular, if the receive data bit is differentially encoded into two Manchester periods, the detection reduces to a simple matter of comparing the integrated $I_L$ of the first Manchester period to that of the second period.

After decoding, the receive signal RBS is separated (e.g. demultiplexed) into data and status information in Demux 614. The data portion may comprise six bits, for example, which may subsequently be serialized into the receive bit stream, RxdBS. In addition, the status bit STA may be used to form an 8-bit wide status word.

Line Side Barrier Interface

Figure 10:
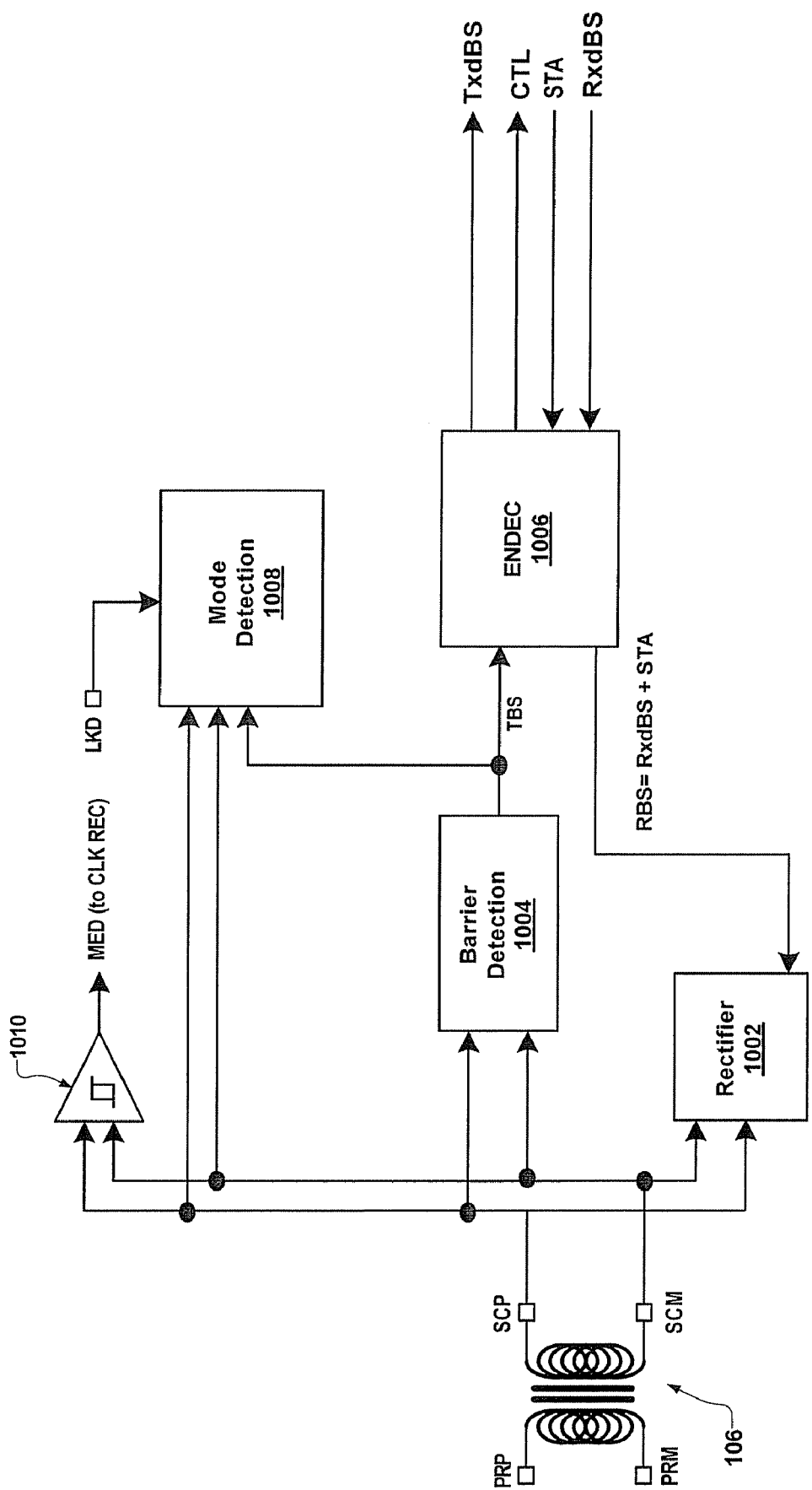
FIG. 10 is a block diagram of a Line Side Barrier Interface in accordance with an embodiment of the present invention.

FIG. 10 is a functional illustration of an embodiment of a Line Side Barrier Interface (LSBI) 902. As illustrated, LSBI 902 comprises Rectifier 1002; Barrier Detection 1004; Encoder/Decoder (ENDEC) 1006; Mode Detection 1008; and amplifier/comparator 1010. Comparator 1010 generates and sends the transmitted Manchester Encoded Data (MED) to the clock recovery loop. MED may be raw data from the barrier or processed data generated in accordance with the illustration of FIG. 15B to ease the task of clock recovery, depending on the state of the clock recovery loop.

In one embodiment, the barrier transformer 106 and the rectification scheme in Rectifier 1002 are such that 3V pulses from the HIC 104 will become 6V pulses to the LIC 108. The 6V pulses are rectified by the Rectifier 1002, which could be a diode bridge or any other rectification scheme (e.g. active or passive), on pins SCP and SCM of the transformer 106 to generate a positive supply voltage, VPX, for the LIC 108.

Barrier Detection 1004 performs raw data detection from the signal at the terminals, SCP and SCM, of the transformer.

In one embodiment, LSBI 902 identifies the state of operation by monitoring the transmit data stream, TBS, coming across the barrier from HIC 104 by checking the number of power pulses and the data pulses or by checking voltage levels of the transmit data stream (e.g., power pulses may be transmitted with a higher voltage than data pulses). For instance, the modes of operation may comprise a mixed mode and a data mode.

In Mixed mode, power transmission and full-duplex data transfer may be time division multiplexed. From reset until the assertion of an Off Hook command, HIC 104 may operate in a "Mixed Mode". During the Mixed mode, the HIC 104 may supply power to LIC 108 across the pulse transformer barrier. In some embodiments, HIC 104 may continue to deliver power to LIC 108 even after the off hook command is asserted.

In Data mode, transmit and receive data may be simultaneously and continuously exchanged between the LIC 108 and HIC 104 at twice the rate of Mixed mode as the power frames can now be used as data frames.

Encoder/Decoder (ENDEC) 1006 performs decoding of the transmit bit stream (TBS) into CTL and TxdBS and performs the reverse of DC Balance Coding performed in 604. That is, the ENDEC 1006 recovers TxdBS (see FIG. 6) on the Line Side.

Clock Recovery

One factor facilitating bi-directional communication across the barrier is having both the HIC and the LIC locked in time (synchronized). For example, switch Rxd 302 in FIG. 3A is preferably opened and closed at the beginning or the end of the Manchester period. In other words Manchester edges in HIC should line up closely with those of the LIC.

Figure 13:
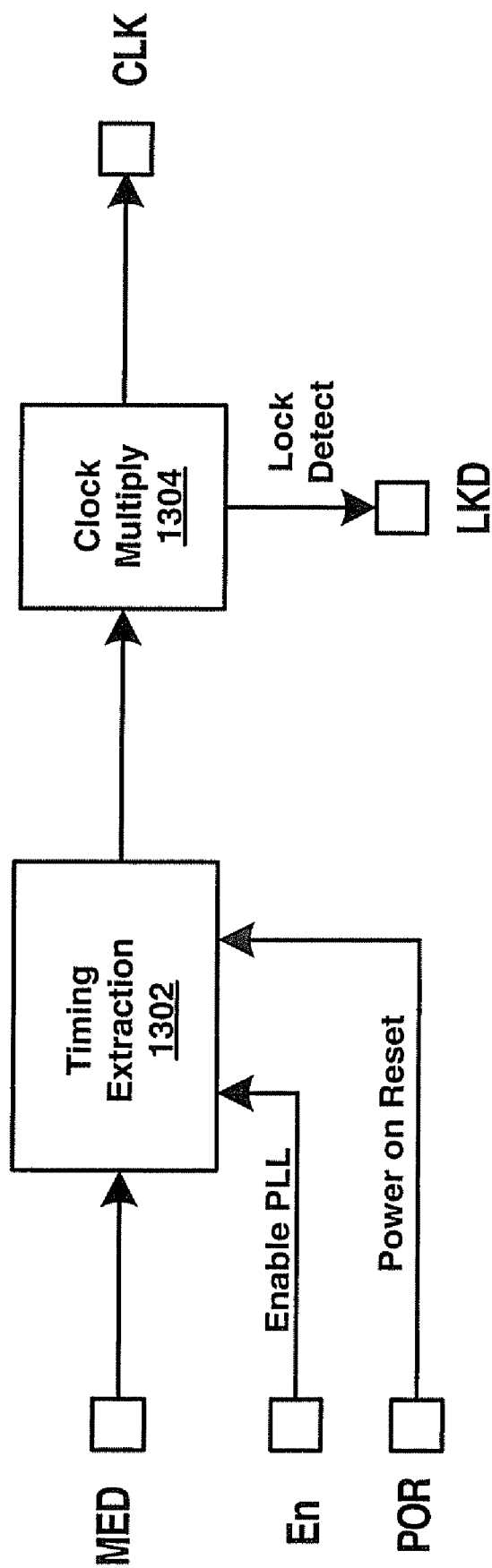
FIG. 13 is block diagram of a clock recovery circuit in accordance with an embodiment of the present invention.

FIG. 13 is an illustration of a clock recovery circuit in accordance with an embodiment of the present invention. As illustrated, clock recovery in the LIC 108 may be performed by a Phase Lock Loop (PLL) comprising a timing extraction block 1302 and a clock multiply block 1304. Upon enablement, timing extraction block 1302 determines the frequency range of the input MED (i.e. Manchester Encoded Data) and properly sets up the Phase Lock Loop. When the PLL locks onto the MED frequency, the signal LKD is asserted and sent to LSBI 902.

The range of frequency associated with the input, MED, may vary significantly. Thus, the clock recovery circuit is preferably configured to deal with a wide frequency range.

To facilitate the clock recovery, the HIC 104 may send a preamble containing only clock and power pulses as shown in FIG. 15A. There will be an irregularity in the waveform at the boundaries between power and data frames due to the coding scheme that matches the pre-Manchester bits that saddle the boundary.

In one embodiment, LSBI 902 first inverts the power pulses to make them a true alternating preamble as shown in FIG. 15B. After inversion, the pulse train becomes a seamless preamble pattern at half the frequency of the Manchester clock, i.e. transitions only occur at the rising edge of the Manchester clock. This makes the initial locking process relatively easy. The Timing Extraction circuit 1302 detects the approximate frequency range of the inverted preamble. This information is then used by the PLL to properly set the PLL parameters.

Figure 14:
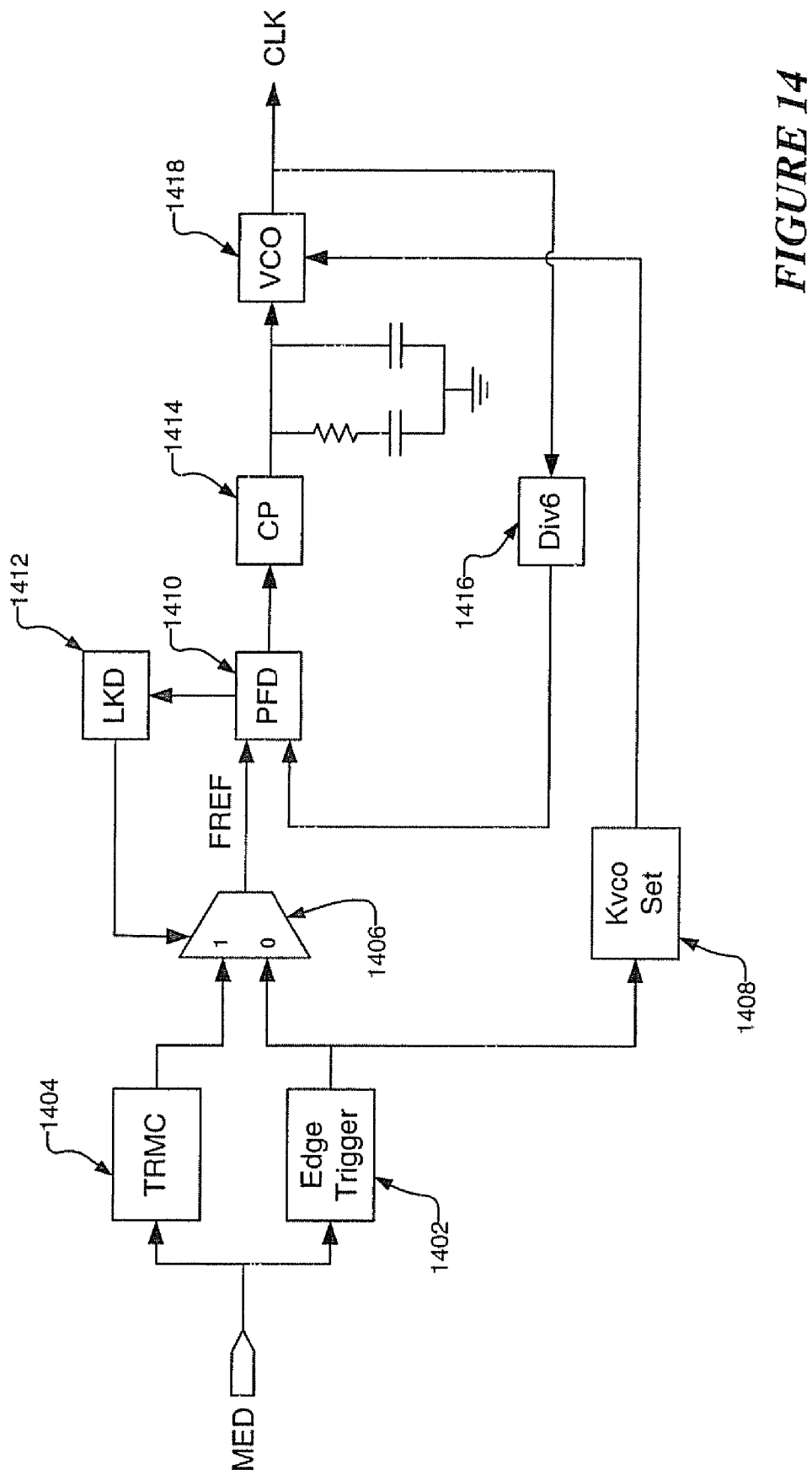
FIG. 14 is a block diagram of a phase-locked loop in accordance with an embodiment of the present invention.

FIG. 14 is a detailed illustration of a PLL in accordance with an embodiment of the present invention. The clock recovery PLL comprises an edge trigger block 1402 (that generates a one-shot at every edge of MED); Timing Recovery Manchester Encoder block (TRMC) 1404; switch 1406; phase detector (PFD) 1410; voltage controlled oscillator gain determination block (Kvco Set) 1408; lock determination block (LKD) 1412; voltage controlled oscillator (VCO) 1418; clock divider block (Div6) 1416; and Charge Pump (CP) 1414.

In one embodiment of the clock recovery circuit, there are three steps involved in acquiring a clock (CLK) that is locked to Manchester Encoded Data. The first step is to estimate the required Kvco settings (Kvco 1408) for the PLL for a given input clock (preamble) represented by the input MED. This may be accomplished by enabling Kvco counters in the clock extraction block to start counting MED edges for a specific period.

After counting is complete, the entire PLL is powered up and the final result of the counter is used to set the Kvco control bits. While counting both edges of the preamble, the generated double input frequency signal at block 1402 may be used as the reference frequency (FREF) to the PLL.

After setting the PLL Kvco control bits and powering up the entire PLL, the PLL begins the process of locking to MED (still preamble). When the PLL has successfully acquired lock, LKD signal goes high, as determined in block 1412.

Once the LKD signal goes high, FREF to the PLL may switch from the bi-directional one-shot 1402 to the output of Timing Recovery Manchester Encoder block (TRMC) 1404, which selects only the valid Manchester transition edges that are present at the constant rate (of Manchester clock). Assertion of the signal LKD may also be used to signal the LSBI 902 that it can start sending data instead of preamble clock to the MED.

Finally, CLK is conveniently multiplied up from the Manchester clock rate, e.g., six times. The rising edge of the recovered Manchester clock is aligned with the valid data transition. The recovered clock signal may then be used in all circuitry on the line side requiring timing information (e.g., an ADC block 908 and ENDEC block 1006).

Thus, an encoding method and apparatus for a dual mode super source follower voltage driver for full duplex digital communication across an isolation barrier transformer have been described. Particular embodiments described herein are illustrative only and should not limit the present invention thereby. The invention is defined by the claims and their full scope of equivalents.

The invention claimed is:

1. A method for transmitting data across a transformer having a primary side and a secondary side comprising:
   modulating impedance of said secondary side of said transformer based on a first data stream;
   modulating voltage of said primary side of said transformer based on a second data stream to produce a total current comprising a load current component and a magnetizing current component, said magnetizing current component having a predictable form;
   isolating said load current component from said total current based on said predictable form of said magnetizing current component;
   extracting said first data stream from said load current.

2. The method of claim 1 wherein said step of isolating said load current component from said total current comprises measuring said total current at times when said magnetizing current is near zero.

3. The method of claim 1 wherein said step of isolating said load current component from said total current comprises the step of generating a cancellation current based on said predictable form of said magnetizing current component.

4. The method of claim 1 wherein said step of modulating voltage of said primary side of said transformer based on said second data stream is performed during a first time interval.

5. The method of claim 4 further comprising the step of modulating voltage of said primary side of said transformer based on a third data stream during a second time interval.

6. The method of claim 5 wherein said voltage of said primary side of said transformer is modulated based on said second data stream such that said voltage has a value of approximately zero at an end of said first time interval.

7. The method of claim 6 wherein said voltage of said primary side of said transformer is modulated based on said third data stream such that said voltage has a value of approximately zero at a beginning of said second time interval.

8. The method of claim 7 wherein said voltage of said primary side of said transformer is modulated based on said second data stream such that said voltage has a value of approximately zero at a beginning of said first time interval.

9. The method of claim 8 wherein said voltage of said primary side of said transformer is modulated based on said third data stream such that said voltage has a value of approximately zero at an end of said second time interval.

10. The method of claim 7 wherein said second time interval directly follows said first time interval.

11. The method of claim 9 wherein said first time interval directly follows said second time interval.

12. The method of claim 1 wherein said first data stream comprises receive data.

13. The method of claim 12 wherein said second data stream comprises transmit data.

14. The method of claim 4 wherein said third data stream comprises power pulses.

15. The method of claim 14 wherein said third data stream comprises control data.

16. The method of claim 1 further comprising the step of extracting said second data stream from a voltage of said secondary side of said transformer.

17. The method of claim 14 further comprising the step of extracting said second data stream from a voltage of said secondary side of said transformer during said first time interval.

18. The method of claim 17 further comprising the step of extracting said third data stream from a voltage of said secondary side of said transformer during said second time interval.

* * * * *

UNITED STATES PATENT AND TRADEMARK OFFICE
CERTIFICATE OF CORRECTION

PATENT NO.       : 8,111,761 B2
APPLICATION NO.  : 12/726648
DATED            : February 7, 2012
INVENTOR(S)      : Russell Hershbarger It is certified that error appears in the above-identified patent and that said Letters Patent is hereby corrected as shown below:

| | |
|---|---|
| Column 8, Line 19 | Delete "Tout" and insert --Iout-- |
| Column 8, Line 30 | Delete "Tout" and insert --Iout-- |
| Column 11, Line 35 | Delete "of" |
| Column 12, Line 16 | Delete "voltage" and insert --Voltage-- |
| Column 12, Line 27 | Delete "minor" and insert --mirror-- |
| Column 17, Line 2 | Delete "hid" and insert --Ixid-- |

Signed and Sealed this
Seventeenth Day of April, 2012

David J. Kappos
*Director of the United States Patent and Trademark Office*